United States Patent
Xu et al.

(10) Patent No.: US 12,302,421 B2
(45) Date of Patent: May 13, 2025

(54) METHOD AND NETWORK NODE FOR PORT MANAGEMENT

(71) Applicant: Telefonaktiebolaget LM Ericsson (publ), Stockholm (SE)

(72) Inventors: Wenliang Xu, Shanghai (CN); Bo Zhang, Guangzhou (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 358 days.

(21) Appl. No.: 17/927,519

(22) PCT Filed: May 17, 2021

(86) PCT No.: PCT/CN2021/094070
§ 371 (c)(1),
(2) Date: Nov. 23, 2022

(87) PCT Pub. No.: WO2021/238697
PCT Pub. Date: Dec. 2, 2021

(65) Prior Publication Data
US 2023/0247691 A1    Aug. 3, 2023

(30) Foreign Application Priority Data

May 25, 2020 (WO) ................ PCT/CN2020/092090

(51) Int. Cl.
*H04W 76/11* (2018.01)
*H04W 40/24* (2009.01)
*H04W 76/30* (2018.01)

(52) U.S. Cl.
CPC ............ *H04W 76/11* (2018.02); *H04W 40/24* (2013.01); *H04W 76/30* (2018.02)

(58) Field of Classification Search
CPC .. H04L 61/103; H04W 40/24; H04W 68/005; H04W 76/10; H04W 76/11; H04W 76/12; H04W 76/30
USPC ................ 370/252, 329, 352, 401
See application file for complete search history.

(56) References Cited

U.S. PATENT DOCUMENTS

2019/0261453 A1    8/2019  Jain et al.
2022/0078863 A1*   3/2022  Gupta .................. H04W 76/12

FOREIGN PATENT DOCUMENTS

WO       2017167603 A1    10/2017

OTHER PUBLICATIONS

3GPP TS 29.122 V15.6.0, 3rd Generation Partnership Project; Technical Specification Group Core Network and Terminals; T8 reference point for Northbound APIs; (Release 15) (Year: 2019).*

(Continued)

*Primary Examiner* — Harun Chowdhury
(74) *Attorney, Agent, or Firm* — Withrow & Terranova, PLLC

(57) ABSTRACT

The present disclosure provides a method in a Network Exposure Function, NEF. The method includes: receiving, from an Application Function, AF, a request for dynamically reserving a Reliable Data Service, RDS, port resource in association with a Non-Internet Protocol 'IP' Data Delivery, NIDD, configuration, the request containing an indication indicating whether the reserving of the RDS port resource requires confirmation with the terminal device; and transmitting, to the AF, a response to the request.

18 Claims, 8 Drawing Sheets

(56) References Cited

OTHER PUBLICATIONS

C3-191155, Update to NIDD APIs for RDS Dynamic Port Management (Year: 2019).*
Author Unknown, "Technical Specification Group Services and System Aspects; System architecture for the 5G System (5GS); Stage 2 (Release 16)," Technical Specification 23.501, Version 16.4.0, Mar. 2020, 3GPP Organizational Partners, 430 pages.
Author Unknown, "Technical Specification Group Services and System Aspects; Procedures for the 5G System (5GS); Stage 2 (Release 16)," Technical Specification 23.502, Version 16.4.0, Mar. 2020, 3GPP Organizational Partners, 582 pages.
Author Unknown, "Technical Specification Group Services and System Aspects; Architecture enhancements to facilitate communications with packet data networks and applications (Release 16)," Technical Specification 23.682, Version 16.6.0, Mar. 2020, 3GPP Organizational Partners, 134 pages.
Author Unknown, "Technical Specification Group Core Network and Terminals; Protocol for Reliable Data Service; Stage 3 (Release 16)," Technical Specification 24.250, Version 16.2.0, Dec. 2019, 3GPP Organizational Partners, 31 pages.
Author Unknown, "Technical Specification Group Core Network and Terminals; T8 reference point for Northbound APIs; (Release 16)," Technical Specification 29.122, Version 16.5.0, Mar. 2020, 3GPP Organizational Partners, 345 pages.
International Search Report and Written Opinion for International Patent Application No. PCT/CN2021/094070, mailed Aug. 27, 2021, 14 pages.
Examination Report No. 1 for Australian Patent Application No. 2021278033, mailed Jun. 27, 2023, 3 pages.
Decision to Grant for Japanese Patent Application No. 2022-568647, mailed Nov. 24, 2023, 4 pages.

* cited by examiner

METHOD AND NETWORK NODE FOR PORT MANAGEMENT

This application is a 35 U.S.C. § 371 national phase filing of International Application No. PCT/CN2021/094070, filed May 17, 2021, which claims the benefit of International Application No. PCT/CN2020/092090, filed May 25, 2020, the disclosures of which are incorporated herein by reference in their entireties.

TECHNICAL FIELD

The present disclosure relates to communication technology, and more particularly, to a method and a network node for port management.

BACKGROUND

This section is intended to provide a background to the various embodiments of the technology described in this disclosure. The description in this section may include concepts that could be pursued but are not necessarily ones that have been previously conceived or pursued. Therefore, unless otherwise indicated herein, what is described in this section is not prior art to the description and/or claims of this disclosure and is not admitted being prior art by the mere inclusion in this section.

Non-Internet Protocol (IP) data is considered to be unstructured and is thus also referred to as unstructured data in the $3^{rd}$ Generation Partnership Project (3GPP) specifications. Non-IP Data Delivery (NIDD) is defined in the 3GPP Technical Specification (TS) 23.682, V16.6.0 or TS 23.501, V16.4.0, each of which is incorporated herein by reference in its entirety. NIDD functions may be used to handle Mobile Originated (MO) and Mobile Terminated (MT) communication with terminal devices (or User Equipments (UEs)).

An association between an Application Function (AF) (or Service Capability Server/Application Server (SCS/AS)) and a Packet Data Network (PDN) connection to a Network Exposure Function (NEF) (or Service Capability Exposure Function (SCEF)) needs to be established to enable transfer of non-IP data between a terminal device and the AF. When a Reliable Data Service (RDS) is enabled, the NEF determines the association based on port numbers and provisioned policies that may be used to map SCS/AS identities and terminal device identities to a Data Network Name (DNN) or Single Network Slice Selection Assistance Information (S-NSSAI) (or Access Point Name (APN)).

The RDS may be used between a terminal device and an NEF when using a PDN Connection of PDN Type 'Non-IP'. The RDS provides a mechanism for the NEF to determine if data has been successfully delivered to the terminal device and for the terminal device to determine if the data has been successfully delivered to the NEF. When a requested acknowledgement is not received, the RDS retransmits the data. The service is enabled or disabled based on the APN configuration per Service Level Agreement (SLA). When the RDS is enabled, a protocol is used between end-points of a Non-IP PDN connection. The protocol uses a packet header to identify if a packet requires no acknowledgement, requires an acknowledgement, or is an acknowledgment and to allow detection and elimination of duplicate Protocol Data Units (PDUs) at the receiving endpoint. The RDS supports both single and multiple applications within the terminal device. Port numbers in the header are used to identify an application at the originator and to identify an application at the receiver.

Referring to the 3GPP TS 24.250, V16.2.0, which is incorporated herein by reference in its entirety, RDS ports can be dynamically managed by the terminal device and/or the NEF. The terminal device and/or the NEF may support reservation of the source and the destination port numbers and subsequent release of the reserved port numbers.

SUMMARY

In dynamic management of RDS ports, for example, an AF may desire to reserve or release a pair of RDS ports, including an RDS port at an NEF and an RDS port at a terminal device, at the NEF, and the reservation or release may fail since e.g., the terminal device may be in a sleep state and thus may not be able to respond. Such reservation or release may also fail due to Hyper Text Transfer Protocol (HTTP) timeout as the processing time of the RDS protocol messages is much longer than a typical HTTP client timer. In another example, in some cases where such reservation or release fails, or in some other cases where a terminal device requests for reserving and releasing an RDS port at the NEF or notifies the NEF of an RDS port reserved at the terminal device, it is desired that a corresponding AF can be notified properly. In yet another example, an AF or UE may request releasing an RDS port that is not created by itself, which may be problematic.

It is an object of the present disclosure to provide a method and network node, capable of solving at least one of the above problems.

According to a first aspect of the present disclosure, a method in an NEF is provided. The method includes: receiving, from an AF, a request for dynamically reserving an RDS port resource in association with an NIDD configuration. The request contains an indication indicating whether the reserving of the RDS port resource requires confirmation with the terminal device. The method further includes: transmitting, to the AF, a response to the request.

In an embodiment, the request may contain a Uniform Resource Identifier (URI) of the RDS port resource. The URI indicates a first port at the NEF and a second port at a terminal device.

In an embodiment, the method may further include, when the indication indicates that the reserving of the RDS port resource requires no confirmation with the terminal device: reserving the RDS port resource at the NEF when the first port and/or the second port does not exist in any NIDD configuration. The response may indicate that the RDS port resource has been reserved at the NEF.

In an embodiment, the method may further include, subsequent to the operation of reserving: notifying the terminal device that the RDS port resource has been reserved at the NEF.

In an embodiment, the method may further include, when the indication indicates that the reserving of the RDS port resource requires confirmation with the terminal device: initiating an interaction with the terminal device to reserve the RDS port resource at the terminal device, when the first port and/or the second port does not exist in any NIDD configuration.

In an embodiment, the response may indicate that the confirmation is still ongoing, before a timer associated with the request expires.

In an embodiment, the method may further include, subsequent to transmitting the response: receiving from the terminal device an RDS response confirming the reserving of the RDS port resource; reserving the RDS port resource at the NEF; and notifying the AF of one or more RDS ports currently reserved at the NEF.

In an embodiment, the method may further include, subsequent to the operation of reserving: maintaining at the NEF a record that the RDS port resource is reserved by the AF.

In an embodiment, the method may further include, subsequent to the operation of initiating: receiving from the terminal device an RDS response indicating failure of the confirmation; and notifying the AF of one or more RDS ports currently reserved at the NEF.

In an embodiment, when the indication indicates that the reserving of the RDS port resource requires confirmation with the terminal device and when the NEF fails to interact with the terminal device as no Packet Data Network (PDN) connection has been established with the terminal device, the response may indicate that no PDN connection has been established with the terminal device.

In an embodiment, the response may indicate failure in reserving the RDS port resource at the NEF, when the first port and/or the second port already exists in any NIDD configuration.

According to a second aspect of the present disclosure, a method in an NEF is provided. The method includes: receiving, from an AF, a request for dynamically releasing an RDS port resource in association with an NIDD configuration. The request contains an indication indicating whether the releasing of the RDS port resource requires confirmation with a terminal device. The method further includes: transmitting, to the AF, a response to the request.

In an embodiment, the method may further include, when the indication indicates that the releasing of the RDS port resource requires no confirmation with the terminal device: releasing the RDS port resource at the NEF when the RDS port resource exists in the NIDD configuration and the RDS port resource is reserved by the AF. The response may indicate that the RDS port resource has been released at the NEF.

In an embodiment, the method may further include: notifying the terminal device that the RDS port resource has been released at the NEF.

In an embodiment, the method may further include: when the indication indicates that the releasing of the RDS port resource requires confirmation with the terminal device: initiating an interaction with the terminal device to release the RDS port resource at the terminal device, when the RDS port resource exists in the NIDD configuration and the RDS port resource is reserved by the AF.

In an embodiment, the response may indicate that the confirmation is still ongoing, before a timer associated with the request expires.

In an embodiment, the method may further include, subsequent to transmitting the response: receiving from the terminal device an RDS response confirming the releasing of the RDS port resource or indicating failure in releasing the RDS port resource; releasing the RDS port resource at the NEF; and notifying the AF of one or more RDS ports currently reserved at the NEF.

In an embodiment, the response may indicate failure in releasing the RDS port resource at the NEF, when the RDS port resource does not exist in the NIDD configuration or the RDS port resource is not reserved by the AF.

In an embodiment, when the indication indicates that the releasing of the RDS port resource requires confirmation with the terminal device and when the NEF fails to interact with the terminal device as no PDN connection has been established with the terminal device, the response may indicate that no PDN connection has been established with the terminal device.

According to a third aspect of the present disclosure, a method in an NEF is provided. The method includes: receiving, in an MO NIDD procedure associated with an NIDD configuration, a RDS request associated with an RDS port resource from a terminal device; and notifying an AF associated with the NIDD configuration of one or more RDS ports currently reserved at the NEF.

In an embodiment, the RDS request may be for reserving an RDS port resource, and contain a URI of the RDS port resource. The URI indicates a first port at the NEF and a second port at the terminal device. The method may further include: reserving the RDS port resource at the NEF when the first port and/or the second port does not exist in any NIDD configuration; and transmitting, in an MT NIDD procedure, to the terminal device an RDS response indicating that the RDS port resource has been reserved at the NEF.

In an embodiment, the method may further include: maintaining at the NEF an indication that the RDS port resource is reserved by the terminal device.

In an embodiment, the RDS request may be for releasing an RDS port resource, and the method may further include: releasing the RDS port resource at the NEF when the RDS port resource exists in the NIDD configuration and the RDS port resource is reserved by the terminal device; and transmitting, in an MT NIDD procedure, to the terminal device an RDS response indicating that the RDS port resource has been released at the NEF.

In an embodiment, the RDS request may be for notifying the NEF of an RDS port resource reserved at the terminal device. The RDS port resource has a URI indicating a first port at the NEF and a second port at the terminal device. The method may further include: reserving the RDS port resource at the NEF when the first port and/or the second port does not exist in any NIDD configuration.

In an embodiment, the method may further include: maintaining at the NEF a record that the RDS port resource is reserved by the terminal device.

According to a fourth aspect of the present disclosure, a network node is provided. The network node includes a processor and a memory. The memory contains instructions enabling the network node to implement an NEF. The network node is configured to, when implementing the NEF, perform the method according to the above first, second and/or third aspect.

According to a fifth aspect of the present disclosure, a computer-readable storage medium is provided. The computer-readable storage medium has computer-readable instructions embodied therein. When the computer-readable instructions are executed by a processor of a network node, the computer-readable instructions configure the network node to perform the method according to the above first, second and/or third aspect.

According to a sixth aspect of the present disclosure, a method in an AF is provided. The method includes: transmitting, to an NEF, a request for dynamically reserving or releasing an RDS port resource in association with an NIDD configuration. The request contains an indication indicating whether the reserving or releasing of the RDS port resource requires confirmation with the terminal device. The method further includes: receiving, from the NEF, a response to the request.

In an embodiment, when the indication indicates that the reserving or releasing of the RDS port resource requires no confirmation with the terminal device, the response may indicate that the RDS port resource has been reserved or released at the NEF, or indicate failure in reserving or releasing the RDS port resource at the NEF.

In an embodiment, when the indication indicates that the reserving or releasing of the RDS port resource requires confirmation with the terminal device, the response may indicate that the confirmation is still ongoing, before a timer associated with the request expires.

In an embodiment, the method may further include, subsequent to receiving the response: receiving from the NEF a notification of one or more RDS ports currently reserved at the NEF.

In an embodiment, when the indication indicates that the reserving or releasing of the RDS port resource requires confirmation with the terminal device, the response may indicate failure in reserving the RDS port resource at the NEF, or indicate that no PDN connection has been established with the terminal device.

According to a seventh aspect of the present disclosure, a network node is provided. The network node includes a processor and a memory. The memory contains instructions enabling the network node to implement an AF. The network node is configured to, when implementing the AF, perform the method according to the above sixth aspect.

According to an eighth aspect of the present disclosure, a computer-readable storage medium is provided. The computer-readable storage medium has computer-readable instructions embodied therein. When the computer-readable instructions are executed by a processor of a network node, the computer-readable instructions configure the network node to perform the method according to the above sixth aspect.

With the embodiments of the present disclosure, an indication indicating whether confirmation with a terminal device is required can be included in a request from an AF for dynamically reserving or releasing an RDS port resource, such that an NEF can dynamically reserve or release the RDS port resource in accordance with the indication. In addition, upon receiving from a terminal device an RDS request for dynamically reserving or releasing an RDS port resource or for notifying an RDS port resource reserved at the terminal device, an NEF can notify an associated AF of RDS ports currently reserved at the NEF. The embodiments of the present disclosure allow dynamic RDS management, e.g., RDS port reservation, release, and notification, to be carried out more efficiently, flexibly, or properly.

BRIEF DESCRIPTION OF THE DRAWINGS

The above and other objects, features and advantages will be more apparent from the following description of embodiments with reference to the figures, in which.

DETAILED DESCRIPTION

Figure 1:
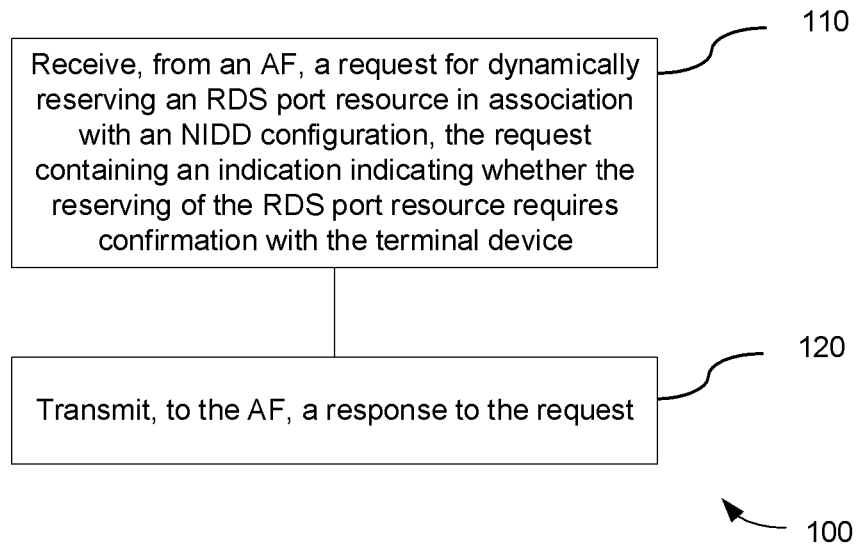
FIG. 1 is a flowchart illustrating a method in an NEF according to an embodiment of the present disclosure.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Within the context of this disclosure, the term "terminal device" or "UE" refers to any end device that can access a wireless communication network and receive services therefrom. By way of example and not limitation, a terminal device or UE may refer to a mobile terminal or any other suitable device. As one example, a terminal device or UE may be configured for communication in accordance with one or more communication standards promulgated by the 3GPP, such as 3GPP's Global System for Mobile Communications (GSM), Universal Mobile Telecommunications System (UMTS), the $4^{th}$ Generation (4G) or Long Term Evolution (LTE), and/or the $5^{th}$ Generation (5G) standards. As used herein, a terminal device or UE may not necessarily have a "user" in the sense of a human user who owns and/or operates the relevant device. In some embodiments, a terminal device or UE may be configured to transmit and/or receive information without direct human interaction. For instance, a terminal device or UE may be designed to transmit information to a network on a predetermined schedule, when triggered by an internal or external event, or in response to requests from the wireless communication network. A terminal device or UE may represent a device that is intended for sale to, or operation by, a human user but that may not initially be associated with a specific human user. The terminal device or UE may support device-to-device (D2D) communication, for example by implementing a 3GPP standard for sidelink communication and may in this case be referred to as a D2D communication device. As yet another example, in an Internet of Things (IOT) scenario, a terminal device or UE may represent a machine or other device that performs monitoring and/or measurements, and transmits the results of such monitoring and/or measurements to another UE and/or network equipment. The terminal device or UE may in this case be a machine-to-machine (M2M) device, which may in a 3GPP context be referred to as a machine-type communication (MTC) device. As one particular example, the terminal device or UE may implement the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device or UE may represent a vehicle or other equipment that is capable of monitoring and/or reporting on its operational status or other functions associated with its operation.

As used herein, a "network node" refers to any physical or virtual node that is configured to implement a network function, including but not limited to network functions specified by the 3GPP. A network node can be implemented in a physical device or a virtualized environment, e.g., a cloud environment.

In the following description and claims, unless defined otherwise, all technical and scientific terms used herein have the same meaning as commonly understood by one of ordinary skills in the art to which this disclosure belongs.

FIG. 1 is a flowchart illustrating a method 100 according to an embodiment of the present disclosure. The method 100 can be performed at an NEF. While the method 100 will be described below with reference to the 5G system mainly, it is to be noted here that it can also be applied to the 4G system, in which case it can be performed at an SCEF.

At block 110, a request for dynamically reserving an RDS port resource in association with an NIDD configuration is received from an AF (or an SCS/AS in the 4G system). The NIDD configuration may e.g., have been created by the AF in accordance with Section 4.25.3 of TS 23.502, V16.4.0, which is incorporated herein by reference in its entirety (or by the SCS/AS in accordance with Section 5.13.2 of TS 23.682). The request contains an indication indicating whether the reserving of the RDS port resource requires confirmation with the terminal device.

Here, the request may contain a URI of the RDS port resource, e.g., Resource URI defined in Table 4 as described later. The URI indicates a first port at the NEF and a second port at a terminal device. In other words, the RDS port resource may include a pair of ports, i.e., the first port at the NEF and the second port at the terminal device.

At block 120, a response to the request is transmitted to the AF.

In an example, when the indication indicates that the reserving of the RDS port resource requires no confirmation with the terminal device, the RDS port resource can be reserved at the NEF, without interaction with the terminal device for confirmation, when the first port and/or the second port does not exist in any NIDD configuration, e.g., in any NIDD configuration in a same DNN or S-NSSAI (or a same APN in the 4G system) as the NIDD configuration. In this case, the response transmitted to the AF in the block 120 may indicate that the RDS port resource has been reserved at the NEF.

In an example, the NEF may also notify the terminal device that the RDS port resource has been reserved at the NEF. In an example, the NEF may maintain a record that the RDS port resource is reserved by the AF.

On the other hand, when the indication indicates that the reserving of the RDS port resource requires confirmation with the terminal device, the NEF may initiate an interaction with the terminal device to reserve the RDS port resource at the terminal device, when the first port and/or the second port does not exist in any NIDD configuration, e.g., in any NIDD configuration in the same DNN or S-NSSAI.

In an example, when the NEF fails to interact with the terminal device as no PDN connection (e.g., unstructured PDN connection) has been established with the terminal device, the response transmitted to the AF in the block 120 may indicate that no PDN connection has been established with the terminal device.

In another example, e.g., after successfully initiating the interaction with the terminal device, the response transmitted to the AF in the block 120 may indicate indicating that the confirmation is still ongoing, before a timer associated with the request expires, such that the AF will not consider the request as having failed due to timeout of the timer. Then, the NEF may receive from the terminal device an RDS response confirming the reserving of the RDS port resource, reserve the RDS port resource at the NEF, and notify the AF of one or more RDS ports currently reserved at the NEF. In this case, the NEF may maintain a record that the RDS port resource is reserved by the AF. Alternatively, the NEF may receive from the terminal device an RDS response indicating failure of the confirmation, and notify the AF of one or more RDS ports currently reserved at the NEF.

No matter whether the indication indicates that the reserving of the RDS port resource requires confirmation with the terminal device, when the first port and/or the second port already exists in any NIDD configuration, e.g., in any NIDD configuration in the same DNN or S-NSSAI, the response transmitted to the AF in the block 120 may indicate failure in reserving the RDS port resource at the NEF.

Figure 2:
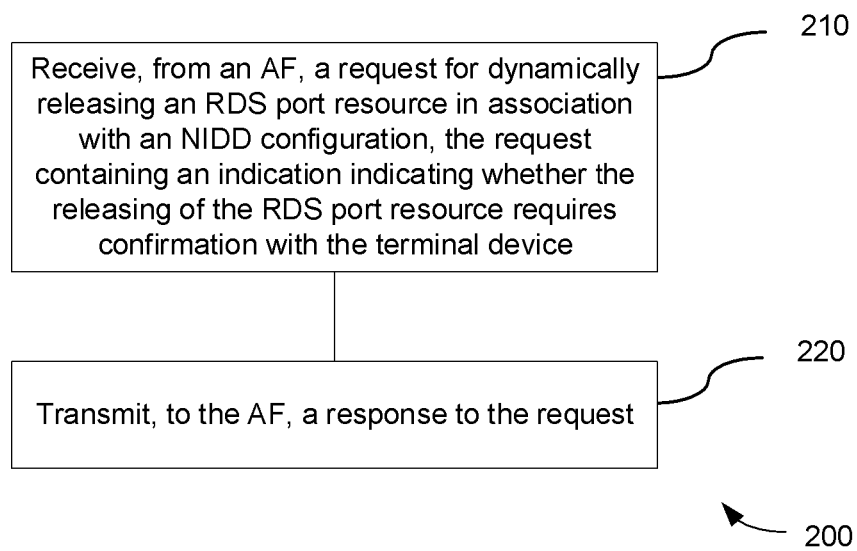
FIG. 2 is a flowchart illustrating a method in an NEF according to another embodiment of the present disclosure.

FIG. 2 is a flowchart illustrating a method 200 according to an embodiment of the present disclosure. The method 200 can be performed at an NEF. While the method 200 will be described below with reference to the 5G system mainly, it is to be noted here that it can also be applied to the 4G system, in which case it can be performed at an SCEF.

At block 210, a request for dynamically releasing an RDS port resource in association with an NIDD configuration is received from an AF (or an SCS/AS in the 4G system). The NIDD configuration may e.g., have been created by the AF in accordance with Section 4.25.3 of TS 23.502 (or by the SCS/AS in accordance with Section 5.13.2 of TS 23.682). The request contains an indication indicating whether the releasing of the RDS port resource requires confirmation with a terminal device.

At block 220, a response to the request is transmitted to the AF.

When the indication indicates that the releasing of the RDS port resource requires no confirmation with the terminal device, the RDS port resource at the NEF can be released, without interaction with the terminal device for confirmation, when the RDS port resource exists in the NIDD configuration and the RDS port resource is reserved by the AF. In this case, the response transmitted to the AF in the block 220 may indicate that the RDS port resource has been released at the NEF.

In an example, the NEF may also notify the terminal device that the RDS port resource has been released at the NEF.

On the other hand, when the indication indicates that the releasing of the RDS port resource requires confirmation with the terminal device, the NEF may initiate an interaction with the terminal device to release the RDS port resource at the terminal device, when the RDS port resource exists in the NIDD configuration and the RDS port resource is reserved by the AF (e.g., when a record maintained at the NEF shows that the RDS port resource is reserved by the AF).

In an example, when the NEF fails to interact with the terminal device as no PDN connection (e.g., unstructured PDN connection) has been established with the terminal device, the response transmitted to the AF in the block 220 may indicate that no PDN connection has been established with the terminal device.

In another example, e.g., after successfully initiating the interaction with the terminal device, the response transmitted to the AF in the block 220 may indicate that the confirmation is still ongoing, before a timer associated with the request expires, such that the AF will not consider the request as having failed due to timeout of the timer. Then, the NEF may receive from the terminal device an RDS response confirming the releasing of the RDS port resource or indicating failure in releasing the RDS port resource, release the RDS port resource at the NEF, and notify the AF of one or more RDS ports currently reserved at the NEF.

No matter whether the indication indicates that the releasing of the RDS port resource requires confirmation with the terminal device, when the RDS port resource does not exist in the NIDD configuration or the RDS port resource is not reserved by the AF (e.g., when a record maintained at the NEF shows that the RDS port resource is reserved by the terminal device), the response transmitted to the AF in the block 220 may indicate failure in releasing the RDS port resource at the NEF.

Figure 3:
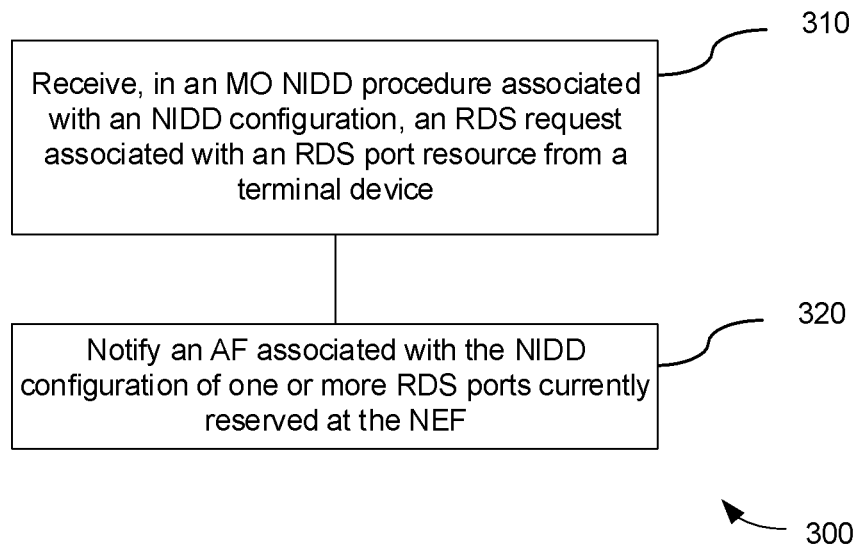
FIG. 3 is a flowchart illustrating a method in an NEF according to yet another embodiment of the present disclosure.

FIG. 3 is a flowchart illustrating a method 300 according to an embodiment of the present disclosure. The method 300 can be performed at an NEF. While the method 300 will be described below with reference to the 5G system mainly, it is to be noted here that it can also be applied to the 4G system, in which case it can be performed at an SCEF.

At block 310, an RDS request associated with an RDS port resource is received from a terminal device, in an MO NIDD procedure associated with an NIDD configuration. The NIDD configuration may e.g., have been created by the AF in accordance with Section 4.25.3 of TS 23.502 (or by the SCS/AS in accordance with Section 5.13.2 of TS 23.682).

At block 320, an AF (or an SCS/AS in the 4G system) associated with the NIDD configuration is notified of one or more RDS ports currently reserved at the NEF.

In an example, the RDS request may be for reserving an RDS port resource. Here, the request may contain a URI of the RDS port resource, e.g., Resource URI defined in Table 4 as described later. The URI indicates a first port at the NEF and a second port at a terminal device. In other words, the RDS port resource may include a pair of ports, i.e., the first port at the NEF and the second port at the terminal device. In this case, the NEF can reserve the RDS port resource when the first port and/or the second port does not exist in any NIDD configuration, e.g., in any NIDD configuration in a same DNN or S-NSSAI (or a same APN) as the NIDD configuration, and transmit to the terminal device an RDS response indicating that the RDS port resource has been reserved at the NEF, in an MT NIDD procedure. Here, the NEF may maintain an indication that the RDS port resource is reserved by the terminal device.

In another example, the RDS request may be for releasing an RDS port resource. In this case, the NEF can release the RDS port resource when the RDS port resource exists in the NIDD configuration and the RDS port resource is reserved by the terminal device (e.g., when a record maintained at the NEF shows that the RDS port resource is reserved by the terminal device). Then, the NEF can transmit to the terminal device an RDS response indicating that the RDS port resource has been released at the NEF.

In yet another example, the RDS request may be for notifying the NEF of an RDS port resource reserved at the terminal device. The RDS port resource may have a URI indicating a first port at the NEF and a second port at the terminal device. In this case, the NEF can reserve the RDS port resource at the NEF when the first port and/or the second port does not exist in any NIDD configuration, e.g., in any NIDD configuration in a same DNN or S-NSSAI (or a same APN) as the NIDD configuration. Here, the NEF may maintain an indication that the RDS port resource is reserved by the terminal device.

Figure 4:
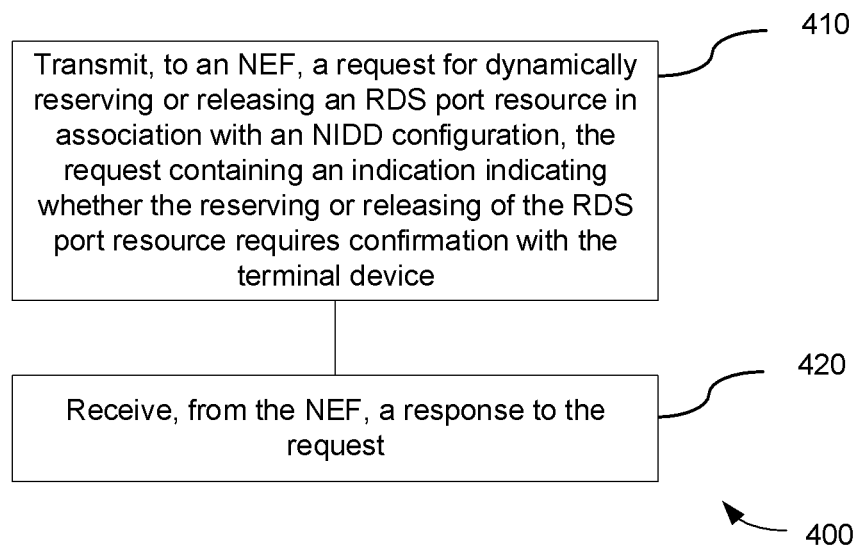
FIG. 4 is a flowchart illustrating a method in an AF according to an embodiment of the present disclosure.

FIG. 4 is a flowchart illustrating a method 400 according to an embodiment of the present disclosure. The method 400 can be performed at an AF. While the method 300 will be described below with reference to the 5G system mainly, it is to be noted here that it can also be applied to the 4G system, in which case it can be performed at an SCS/AS.

At block 410, a request for dynamically reserving or releasing an RDS port resource in association with an NIDD configuration is transmitted to an NEF (or SCEF in the 4G system). The request contains an indication indicating whether the reserving or releasing of the RDS port resource requires confirmation with the terminal device.

At block 420, a response to the request is received from the NEF.

When the indication indicates that the reserving or releasing of the RDS port resource requires no confirmation with the terminal device, the response received from the NEF in the block 420 may indicate that the RDS port resource has been reserved or released at the NEF, or indicate failure in reserving or releasing the RDS port resource at the NEF.

On the other hand, when the indication indicates that the reserving or releasing of the RDS port resource requires confirmation with the terminal device, in the block 420, the response may be received from the NEF before a timer associated with the request expires, indicating that the confirmation is still ongoing, such that the AF will not consider the request as having failed due to timeout of the timer. Then, the AF can receive from the NEF a notification of one or more RDS ports currently reserved at the NEF. In another example, the response received from the NEF in the block 420 may indicate failure in reserving the RDS port resource at the NEF, or indicate that no PDN connection (e.g., unstructured PDN connection) has been established with the terminal device.

Figure 5:
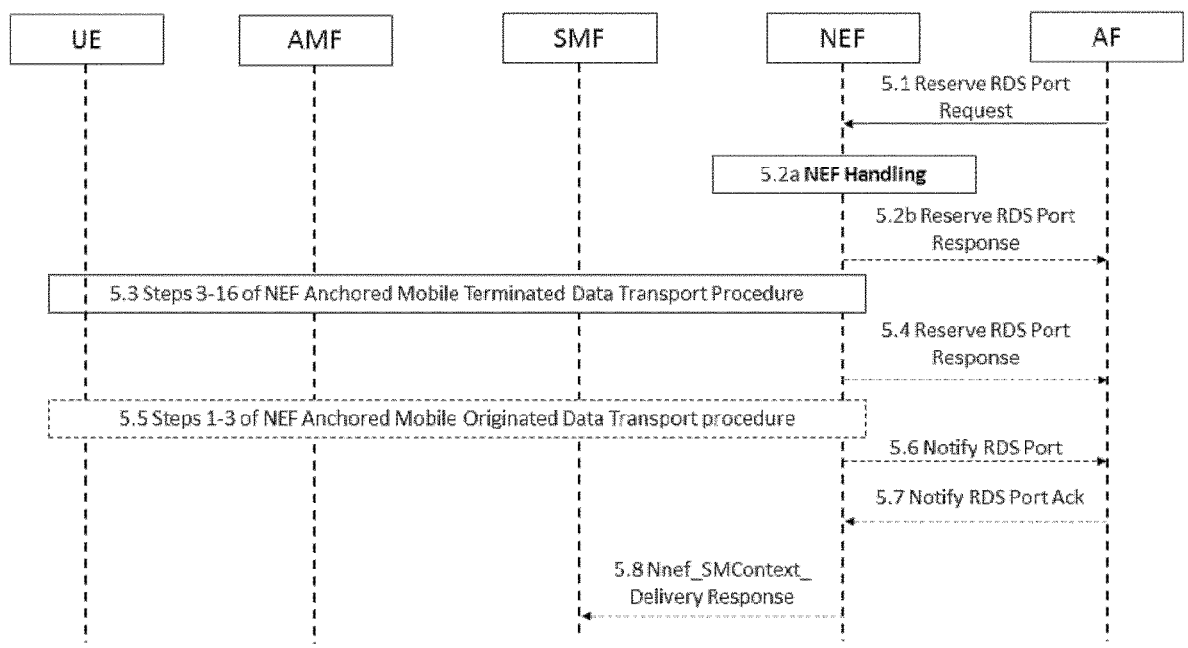
FIG. 5 is a sequence diagram showing a procedure for reserving an RDS port resource according to an embodiment of the present disclosure.
Figure 6:
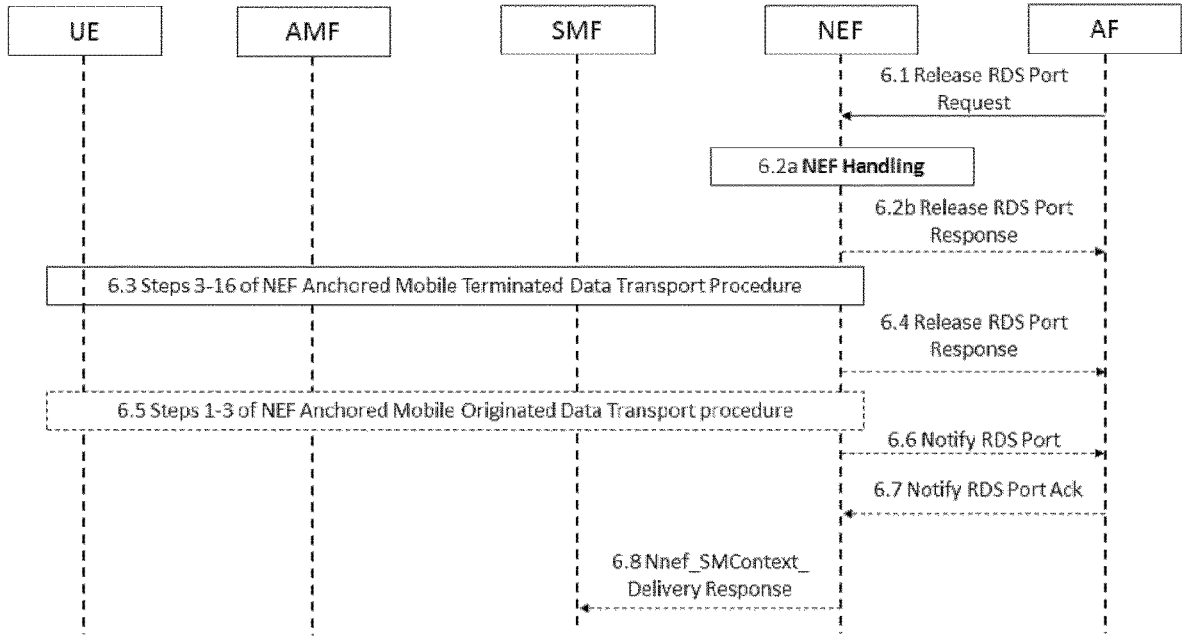
FIG. 6 is a sequence diagram showing a procedure for releasing an RDS port resource according to an embodiment of the present disclosure.
Figure 7:
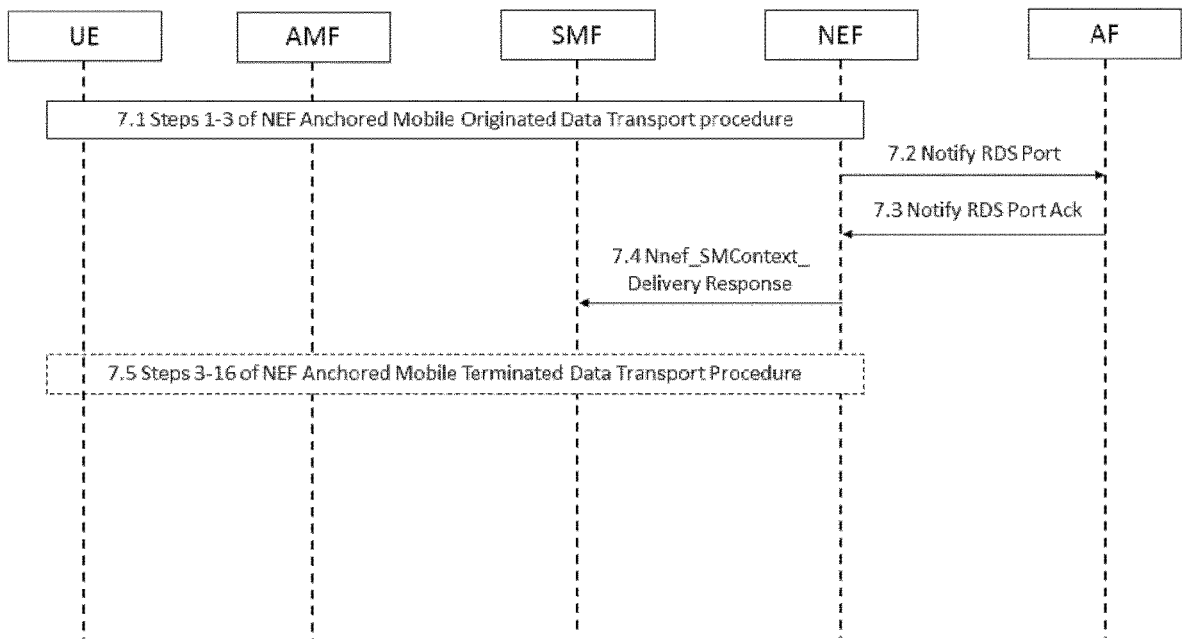
FIG. 7 is a sequence diagram showing a UE-initiated procedure for reserving, releasing or notifying an RDS port resource according to an embodiment of the present disclosure.
Figure 8:
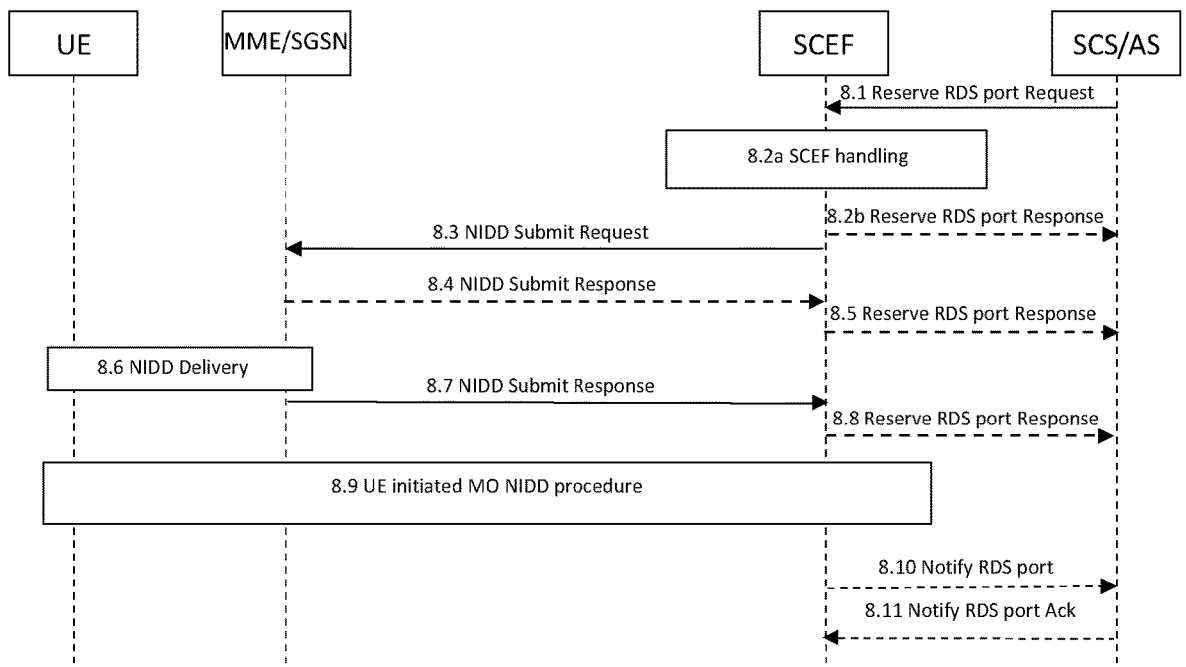
FIG. 8 is a sequence diagram showing a procedure for reserving an RDS port resource according to another embodiment of the present disclosure.
Figure 9:
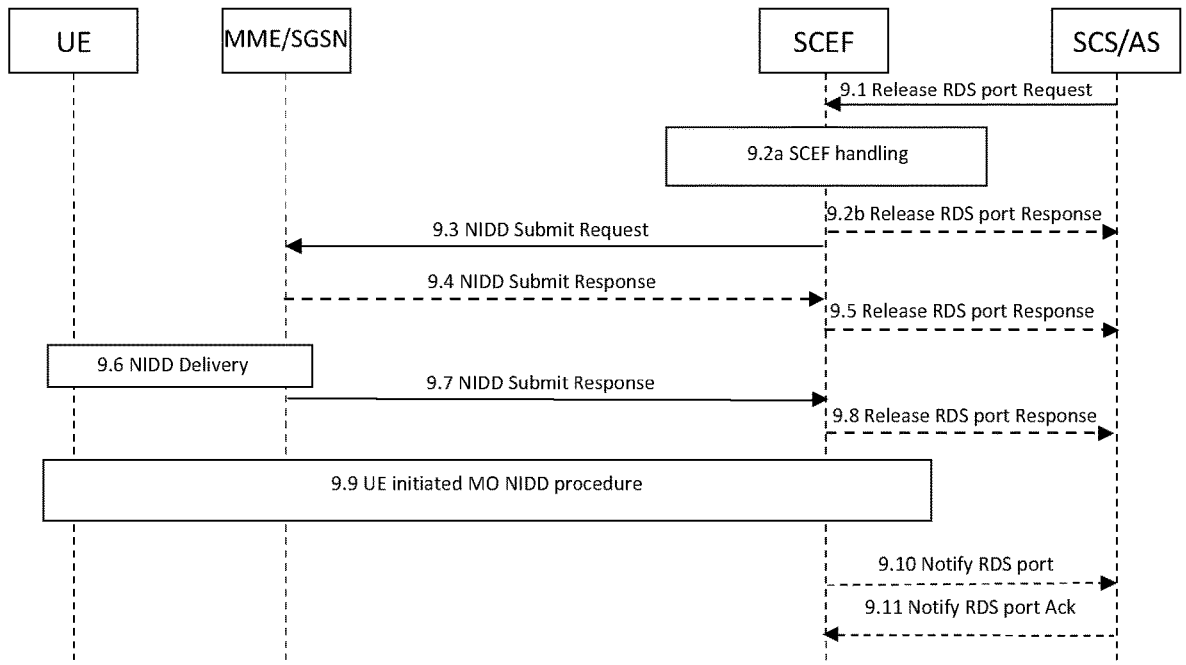
FIG. 9 is a sequence diagram showing a procedure for releasing an RDS port resource according to another embodiment of the present disclosure.
Figure 10:
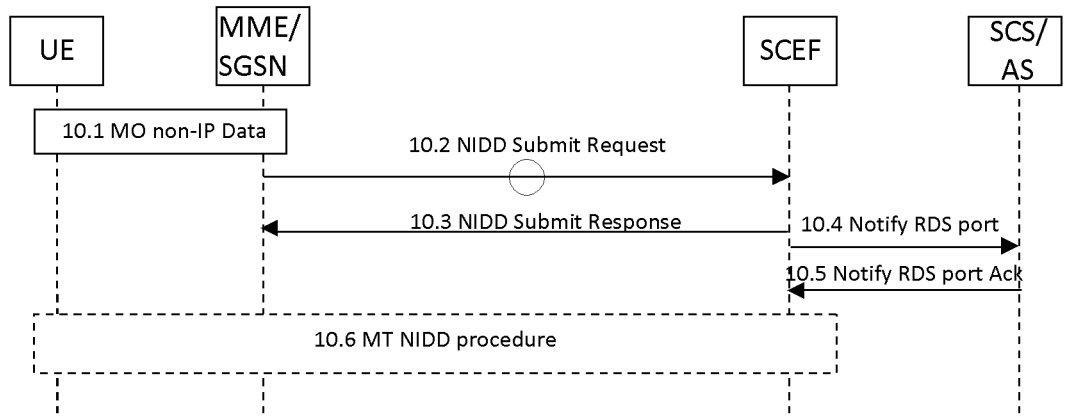
FIG. 10 is a sequence diagram showing a UE-initiated procedure for reserving, releasing or notifying an RDS port resource according to another embodiment of the present disclosure.

The above methods 100~400 will be explained in further detail with reference to the sequence diagrams of FIGS. 5~10. FIGS. 5~7 are sequence diagrams for the 5G system and FIGS. 8~10 are sequence diagrams for the 4G system. The following Tables 1~8 will be used in the description below. For some details in these tables, reference can be made to TS 29.122, V16.5.0, which is incorporated herein by reference in its entirety.

TABLE 1

Definition of type ManagePort

| Attribute name | Data type | Cardinality | Description | Applicability |
|---|---|---|---|---|
| self | Link | 0 . . . 1 | Link to the resource "Individual ManagePort Configuration". This parameter shall be supplied by the NEF (SCEF) in HTTP PUT/GET responses and in the notification POST request. | |
| appId | string | 1 | Indicates the application that is associated with port configuration specified above (as defined in subclause 5.4.2.6 of 3GPP TS 24.250). | |
| manageEntity | ManageEntity | 1 | Indicates the "Individual ManagePort Configuration" resource is created by which function entity (UE or AF (SCS/AS)). | |
| skipUeInquiry | boolean | 0 . . . 1 | Indicate whether to skip UE inquiry. Set to "true" if the AF (SCS/AS) decides to reserve/release port on the NEF (SCEF) without confirming with the UE; otherwise set to "false". Default value is "false" if omitted. | |

TABLE 2

Enumeration ManageEntity

| Enumeration value | Description | Applicability |
|---|---|---|
| UE | Representing the UE. | |
| AS | Representing the Application Server (AF, SCS/AS) | |

TABLE 3

Resources and methods overview

| Resource name | Resource URI | HTTP method | HTTP initiator | Meaning |
|---|---|---|---|---|
| ManagePort Configurations | 3gpp-nidd/v1/{scsAsId}/configurations/{configurationId}/rds-ports | GET | SCS/AS | Read all RDS ManagePort Configurations. |
| Individual ManagePort Configuration | 3gpp-nidd/v1/{scsAsId}/configurations/{configurationId}/rds-ports/{portId} | PUT | SCS/AS | Create a new Individual ManagePort Configuration resource to reserve port numbers |
| | | DELETE | SCS/AS | Delete an Individual ManagePort Configuration resource to release port numbers |
| | | GET | SCS/AS | Read an Individual ManagePort Configuration resource |

TABLE 4

Resource URI variables for resource
"Individual ManagePort Configuration"

| Name | Definition |
|---|---|
| apiRoot | See clause 5.2.4 |
| scsAsId | Identifier of the AF (SCS/AS) of type ScsAsId. |
| configurationId | Identifier of the configuration of type string. The configurationId corresponds to the stage 2 TLTRI. |
| portId | UE port identifier including both UE port number and exposure function port number. Pattern: "^(ue([0-9]\|(1[0-5]))-ef([0-9]\|(1[0-5])))$". |

TABLE 5

Data structures supported by the PUT request/response by the resource

| Request body | Data type | Cardinality | Remarks | |
|---|---|---|---|---|
| | ManagePort | 1 | The ManagePort configuration to be created which represents the information used for reserving the port configuration for an application. | |

| Response body | Data type | Cardinality | Response codes | Remarks |
|---|---|---|---|---|
| | ManagePort | 1 | 201 Created | This indicates the reservation of port configuration for specified application is successful. |
| | None | | 202 Accepted | This indicates the request for reservation of port configuration for specified application is accepted and under processing. |
| | ProblemDetails | 1 | 403 Forbidden | The cause value shall be set to "PORT_NOT_FREE" in the "cause" attribute of the "ProblemDetails" structure. |
| | NiddDownlinkData DeliveryFailure | 1 | 500 Internal Server Error | The request was not successful, the "cause" attribute in "ProblemDetails" data type may include value defined in subclause 5.6.5.3. |

TABLE 6

Data structures supported by the DELETE request/response by the resource

| Request body | Data type | Cardinality | Remarks | |
|---|---|---|---|---|
| | ManagePort | 1 | The ManagePort configuration to be cancelled which represents the information used for releasing the port configuration for an application | |

| Response body | Data type | Cardinality | Response codes | Remarks |
|---|---|---|---|---|
| | None | | 204 No Content | The ManagePort configuration was cancelled successfully and the port configuration was released. |
| | None | | 202 Accepted | This indicates the request for cancellation of port configuration for specified application is accepted and under processing. |
| | ProblemDetails | 1 | 404 Not Found | The cause value shall be set to "PORT_NOT_ASSOC_WITH_APP" in the "cause" attribute of the "ProblemDetails" structure. |
| | NiddDownlinkData DeliveryFailure | 1 | 500 Internal Server Error | The request was not successful, the "cause" attribute in "ProblemDetails" data type may include value defined in subclause 5.6.5.3. |

TABLE 7

Data structures supported by the POST request/response by the resource

| Request body | Data type | Cardinality | Remarks |
|---|---|---|---|
| | ManagePort-Notification | 1 | The parameters that represents the information about port numbers that are reserved for use with an application. |

| Response body | Data type | Cardinality | Response codes | Remarks |
|---|---|---|---|---|
| | Acknowledgement | | 200 OK | The successful notification of reserved port configuration. |
| | (None) | | 204 No Content | The successful acknowledgement of the reserved port configuration without a body. |

TABLE 8

Application errors

| Application Error | HTTP status code | Description | Applicability |
|---|---|---|---|
| QUOTA EXCEEDED | 403 Forbidden | Not enough quota for the MT NIDD | |
| DATA_TOO_LARGE | 403 Forbidden | The non-IP data size is larger than "maximumPacketSize" of the NIDD configuration. | |
| RDS_PORT_UNKNOWN | 403 Forbidden | The NEF/SCEF does not know the RDS port numbers in the MT NIDD, such port numbers does not match with the configured port numbers. | Rds_port_verification |
| OPERATION_PROHIBITTED | 403 Forbidden | Indicates the operation is prohibitted. | |
| PORT_NOT_FREE | 403 Forbidden | Port is not free as it is already associated with an application | Rds_dynamic_port |
| ALREADY_DELIVERED | 404 Not Found | The NEF/SCEF has already delivered the buffered data. | |
| PORT_NOT_ASSOC_WITH_APP | 404 Not Found | Port is free and is not associated with any application. | Rds_dynamic_port |
| SENDING | 409 Conflict | The NEF/SCEF is ready in sending the buffered non-IP data. | |
| TRIGGERED | 500 Internal Server Error | The NEF/SCEF triggered the device but did not buffer the data. The SCS AS may resubmit the data | |
| TEMPORARILY_NOT_REACHABLE | 500 Internal Server Error | The NEF/SCEF has aborted the delivery because the UE is temporarily not reachable. The NEF/SCEF may in addition indicate a requested re-submission time for the data. | |
| NEXT HOP | 500 Internal Server Error | Unsuccessful delivery to the next hop. | |
| TIMEOUT | 500 Internal Server Error | Unsuccessful delivery due to timeout. | |
| NO_PDN_CONNECTION | 500 Internal Server Error | The NEF/SCEF cannot proceed since there is no PDN connection. | |

FIG. 5 is a sequence diagram showing a procedure for dynamically reserving an RDS port resource according to an embodiment of the present disclosure.

As shown, at 5.1, an AF requests an NEF to dynamically reserve an RDS port resource (including an NEF port and a UE port) at the NEF via an HTTP PUT request. Here, the request contains an indication "skipUeInquiry" (see Table 1). At 5.2a, the NEF processes the request. If the "skipUeInquiry" indication is set to "false", it means the RDS port resource is to be reserved with the UE's confirmation or consent. Then if the RDS port resource ("individual ManagePort Configuration" resource), i.e., the NEF port and/or the UE port, already exists in any NIDD configuration in the same DNN/S-NSSAI, at 5.2b, the NEF responds with 403 Forbidden response with a cause value "PORT_NOT_FREE" in the "cause" attribute of the "ProblemDetails" structure; otherwise, the NEF interacts with the UE to reserve the RDS port resource by using the RDS protocol as specified in TS 24.250 and the procedure proceeds with 5.3. If the NEF is not able to interact with the UE because a PDN connection (between Session Management Function (SMF) and NEF) is not established, at 5.2b, the NEF rejects the HTTP PUT request with a 500 Internal Server Error response with a cause value "NO_PDN_CONNECTION".

If the "skipUeInquiry" indication is set to "true", it means the RDS port resource is to be reserved without the UE's confirmation or consent. Then if the requested NEF port and/or UE port already exists in any NIDD configuration within the same DNN/S-NSSAI, the NEF responds with 403 Forbidden response with a cause value "PORT_NOT_FREE" in the "cause" attribute of the "ProblemDetails" structure at 5.2b; otherwise, the NEF creates the "individual ManagePort Configuration" resource and sends an HTTP 201 Created response to the AF at 5.2b. The NEF also marks the resource as being created by the AF (manageEntity in Table 1) and notifies the UE by using the RDS protocol as specified in TS 24.250 and the procedure proceeds with 5.3.

If the "skipUeInquiry" indication is set to "false", the NEF prepares an NIDD packet containing an RDS message (i.e., reserve RDS port). If the "skipUeInquiry" indication is set to "true", the NEF prepares an NIDD packet containing an RDS message (i.e., notify RDS port). At 5.3, the NEF sends the prepared NIDD packet with the RDS message to the UE, according to Steps 3-16 of NEF Anchored Mobile Terminated Data Transport Procedure as specified in clause 4.25.2 of TS23.502. If the NEF receives a successful delivery response from the SMF, the NEF returns 202 Accept to the AF to indicate the processing is still ongoing at 5.4, and the process proceeds with 5.5; otherwise the NEF replies the AF 500 Internal Server Error and a proper cause value indicating the reason for the delivery failure at 5.4.

At 5.5, the UE starts an MO NIDD procedure to include an RDS reserve port response message for port reservation according to Steps 1-3 of NEF Anchored MO Data Transport Procedure as specified in TS23.502. If the "skipUeInquiry" indication is set to "false" and the NEF receives a successful UE RDS reserve port response, the NEF creates the "individual ManagePort Configuration" resource, notifies the AF with the reserved port at 5.6 (as described hereinafter with reference to FIG. 7) and marks the resource as being created by the AF (manageEntity in Table 1); otherwise, the NEF notifies the AF about the currently reserved ports at 5.6 (as described hereinafter with reference to FIG. 7). At 5.7, the AF acknowledges the RDS port notification from the NEF. At 5.8, the NEF acknowledges the MO NIDD request from SMF.

FIG. 6 is a sequence diagram showing a procedure for dynamically releasing an RDS port resource according to an embodiment of the present disclosure.

As shown, at 6.1, an AF requests an NEF to dynamically release an RDS port resource (including an NEF port and a UE port) at the NEF via an HTTP DELETE request. Here, the request contains an indication "skipUeInquiry" (see Table 1). At 6.2a, the NEF processes the request. If the RDS port resource ("individual ManagePort Configuration" resource) does not exist in the same NIDD configuration, the NEF responds with 404 Not Found with a cause value "PORT_NOT_ASSOC_WITH_APP" in the "cause" attribute of the "ProblemDetails" structure at 6.2b; otherwise if the HTTP DELETE request is received for the "Individual NIDD downlink data delivery" resource which is created by the UE (referring to manageEntity of the resource), the NEF rejects the message with 403 Forbidden response with a cause value "OPERATION_PROHIBITED" in the "cause" attribute of the "ProblemDetails" structure at 6.2b. Then if the "individual ManagePort Configuration" resource is created by the AF:

If the "skipUeInquiry" indication is set to "false", it means the RDS port resource is to be released with the UE's confirmation or consent, and the NEF interacts with the UE to release the RDS port resource by using the RDS protocol as specified in TS 24.250 and the procedure proceeds with 6.3. If the NEF is not able to interact with the UE because a PDN connection (between Session Management Function (SMF) and NEF) is not established, at 6.2b, the NEF rejects the HTTP DELETE request with a 500 Internal Server Error response with a cause value "NO_PDN_CONNECTION".

If the "skipUeInquiry" indication is set to "true", it means the RDS port resource is to be released without the UE's confirmation or consent. The NEF deletes the individual ManagePort Configuration resource and responds with an HTTP 204 No Content response to the AF at 6.2b, and notifies the UE by using the RDS protocol as specified in TS 24.250 and the procedure proceeds with 6.3.

If the "skipUeInquiry" indication is set to "false", the NEF prepares an NIDD packet containing an RDS message (i.e., release RDS port). If the "skipUeInquiry" indication is set to "true", the NEF prepares an NIDD packet containing an RDS message (i.e., notify RDS port). At 6.3, the NEF sends the prepared NIDD packet with the RDS message to the UE, according to Steps 3-16 of NEF Anchored Mobile Terminated Data Transport Procedure as specified in clause 4.25.2 of TS23.502. If the NEF receives a successful delivery response from the SMF, the NEF returns 202 Accept to the AF to indicate the processing is still ongoing at 5.4, and the process proceeds with 6.5; otherwise the NEF replies the AF 500 Internal Server Error and a proper cause value indicating the reason for the delivery failure at 6.4.

At 6.5, the UE starts an MO NIDD procedure to include an RDS release port response message for port reservation according to Steps 1-3 of NEF Anchored MO Data Transport Procedure as specified in TS23.502. If the "skipUeInquiry" indication is set to "false" and the NEF receives a UE response, either success or failure (e.g., failure because the RDS port resource had been released at the UE), the NEF deletes the "individual ManagePort Configuration" resource, notifies the AF with the reserved port at 6.6 (as described hereinafter with reference to FIG. 7). At 6.7, the AF acknowledges the RDS port notification from the NEF. At 6.8, the NEF acknowledges the MO NIDD request from SMF.

FIG. 7 is a sequence diagram showing a UE-initiated procedure for dynamically reserving, releasing, or notifying an RDS port resource according to an embodiment of the present disclosure.

As shown, at 7.1, a UE sends an MO NIDD data to an NEF, carrying an RDS request which can be a request for reserving, releasing, or notifying an RDS port resource.

If the RDS request is a request for reserving an RDS port resource (including an NEF port and a UE port), the NEF reserves the RDS port resource ("individual ManagePort Configuration" resource) when the NEF port and/or the UE port does not exist in any NIDD configuration in the same DNN/S-NSSAI, and marks the RDS port resource as being created by the UE (manageEntity in Table 1).

If the RDS request is a request for releasing an RDS port resource, the NEF releases the RDS port resource ("individual ManagePort Configuration" resource) when the RDS port resource exists in the same NIDD configuration and the RDS port resource is reserved by the UE (referring to manageEntity of the resource).

If the RDS request is a request for notifying an RDS port resource (including an NEF port and a UE port) reserved at the UE, the NEF reserves the RDS port resource ("individual ManagePort Configuration" resource) when the NEF port and/or the UE port does not exist in any NIDD configuration in the same DNN/S-NSSAI, and marks the RDS port resource as being created by the UE (manageEntity in Table 1).

Then, at 7.2, the NEF notifies the AF with an HTTP POST request including the currently reserved RDS ports, and the AF acknowledges the POST request at 7.3. At 7.4, the NEF acknowledges the MO NIDD message from an SMF. At 7.5, if the RDS request is a request for reserving/releasing an RDS port resource, the NEF sends a response to the UE, according to Steps 3-16 of NEF Anchored Mobile Terminated Data Transport Procedure as specified in clause 4.25.2 of TS23.502.

FIG. 8 is a sequence diagram showing a procedure for dynamically reserving an RDS port resource according to another embodiment of the present disclosure.

As shown, at 8.1, an SCS/AS requests an SCEF to dynamically reserve an RDS port resource (including an SCEF port and a UE port) at the SCEF via HTTP PUT request. Here, the request contains an indication "skipUeInquiry" (see Table 1). At 8.2a, the SCEF processes the request. If the "skipUeInquiry" indication is set to "false", it means the RDS port resource is to be reserved with the UE's confirmation or consent. Then if the RDS port resource ("individual ManagePort Configuration" resource), i.e., the SCEF port and/or the UE port, already exists in any NIDD configuration in the same APN, at 8.2b, the SCEF responds with 403 Forbidden response with a cause value "PORT_NOT_FREE" in the "cause" attribute of the "ProblemDetails" structure; otherwise, the SCEF interacts with the UE to reserve the RDS port resource by using the RDS protocol as specified in TS 24.250 and the procedure proceeds with 8.3. If the SCEF is not able to interact with the UE because a PDN connection is not established, at 8.2b, the SCEF rejects the HTTP PUT request with a 500 Internal Server Error response with a cause value "NO_PDN_CONNECTION".

If the "skipUeInquiry" indication is set to "true", it means the RDS port resource is to be reserved without the UE's confirmation or consent. Then if the requested SCEF port and/or UE port already exists in any NIDD configuration within the same APN, the SCEF responds with 403 Forbidden response with a cause value "PORT_NOT_FREE" in the "cause" attribute of the "ProblemDetails" structure at 8.2b; otherwise, the SCEF creates the "individual ManagePort Configuration" resource and sends an HTTP 201 Created response to the SCS/AS at 8.2b. The SCEF also marks the resource as being created by the SCS/AS and notifies the UE by using RDS protocol as specified in 3GPP TS 24.250 (referring to 8.3, 8.6, and 8.7).

If the "skipUeInquiry" indication is set to "false", the SCEF prepares an NIDD packet containing an RDS message (i.e., reserve RDS port) and sends it to a Mobility Management Entity (MME)/Serving GPRS (General Packet Radio Service) Support Node (SGSN) at 8.3. If the "skipUeInquiry" indication is set to "true", the SCEF prepares an NIDD packet containing an RDS message (i.e., notify RDS port) and sends it to the MME/SGSN at 8.3.

If the MME/SGSN can immediately deliver the non-IP data to the UE, e.g., when the UE is already in an Evolved Packet System (EPS) Connection Management (ECM)_CONNECTED mode, or the UE is in ECM_IDLE and the MME/SGSN is able to initiate a paging procedure, the procedure proceeds with 8.6.

If the MME/SGSN is aware of the UE being temporarily unreachable, or if the MME/SGSN knows that the UE is not scheduled to be reachable within the SCEF Wait Time, while using power saving functions, e.g., UE Power Saving Mode or extended idle mode DRX, then the MME/SGSN may send an NIDD Submit Response (Cause, Requested Re-Transmission Time) message towards the SCEF at 8.4.

If the "skipUeInquiry" indication is set to "false", and the SCEF receives a negative response from the MME/SGSN, the SCEF rejects the HTTP PUT request with a 500 Internal Server Error response with a proper cause value at 8.5, e.g., "UE temporary unreachable" received from MME/SGSN is mapped to a cause value "TEMPORARILY_NOT_REACHABLE". The response may include a Requested Re-Transmission time to indicate the SCS/AS when the UE is expected to be reachable so that the SCS/AS may prepare any re-configuration for the RDS port resource.

At 8.6, if required, the MME/SGSN pages the UE and delivers the non-IP data to the UE using data transfer via the MME/SGSN procedure. If the MME/SGSN is able to initiate the NIDD delivery at 8.6, then the MME/SGSN sends an NIDD Submit Response (cause) message towards the SCEF at 8.7, acknowledging the NIDD Submit Request received from the SCEF at 8.3.

If the SCEF receives a successful delivery response from the MME/SGSN, at 8.8, the SCEF returns 202 Accept to the SCS/AS to indicate the processing is still ongoing, and the procedure proceeds with 8.9; otherwise the SCEF replies with an SCS/AS 500 Internal Server Error and a proper cause value indicating the reason for the delivery failure at 8.8. At 8.9, the UE starts an MO NIDD procedure to include an RDS response for port reservation.

If the "skipUeInquiry" indication is set to "false" and the SCEF receives a successful UE response, the SCEF creates the "individual ManagePort Configuration" resource, notifies the SCS/AS with the reserved port at 8.10 (as described hereinafter with reference to FIG. 10), and marks the resource as being created by the SCS/AS (manageEntity in Table 1); otherwise, the SCEF notifies the SCS/AS of the currently reserved ports at 8.10 (as described hereinafter with reference to FIG. 10). At 8.11, the SCS/AS acknowledges the notification sent from the SCEF.

FIG. 9 is a sequence diagram showing a procedure for dynamically releasing an RDS port resource according to another embodiment of the present disclosure.

As shown, at 9.1, an SCS/AS requests an SCEF to dynamically release an RDS port resource (including an SCEF port and a UE port) at the SCEF via an HTTP DELETE request. Here, the request contains an indication "skipUeInquiry" (see Table 1). At 9.2a, the SCEF processes the request. If the RDS port resource ("individual ManagePort Configuration" resource) does not exist in the same NIDD configuration, the SCEF responds with 404 Not Found with a cause value "PORT_NOT_ASSOC_WITH_APP" in the "cause" attribute of the "ProblemDetails" structure at 9.2b; otherwise if the HTTP DELETE request is received for the "Individual NIDD downlink data delivery" resource which is created by the UE (referring to manageEntity of the resource), the SCEF rejects the message with 403 Forbidden response with a cause value "OPERATION_PROHIBITED" in the "cause" attribute of the "ProblemDetails" structure at 9.2b. Then if the "individual ManagePort Configuration" resource is created by the SCS/AS:

If the "skipUeInquiry" indication is set to "false", it means the RDS port resource is to be released with the UE's confirmation or consent, and the SCEF interacts with the UE to release the RDS port resource by using the RDS protocol as specified in TS 24.250 and the procedure proceeds with 9.3. If the SCEF is not able to interact with the UE because a PDN connection is not established, at 9.2b, the SCEF rejects the HTTP DELETE request with a 500 Internal Server Error response with a cause value "NO_PDN_CONNECTION".

If the "skipUeInquiry" indication is set to "true", it means the RDS port resource is to be released without the UE's confirmation or consent. The SCEF deletes the individual ManagePort Configuration resource and responds with an HTTP 204 No Content response to the SCS/AS at 9.2b, and notifies the UE by using the RDS protocol as specified in TS 24.250 (referring to 9.3, 9.6, and 9.7).

If the "skipUeInquiry" indication is set to "false", the SCEF prepares an NIDD packet containing an RDS message (i.e., release RDS port) and sends it to an MME/SGSN at 9.3. If the "skipUeInquiry" indication is set to "true", the SCEF prepares an NIDD packet containing an RDS message (i.e., notify RDS port) and sends it to the MME/SGSN.

If the MME/SGSN can immediately deliver the non-IP data to the UE, e.g. when the UE is already in an ECM_CONNECTED mode, or the UE is in ECM_IDLE and the MME/SGSN is able to initiate a paging procedure, the procedure proceeds with 9.6.

If the MME/SGSN is aware of the UE being temporarily unreachable, or if the MME/SGSN knows that the UE is not scheduled to be reachable within the SCEF Wait Time, while using power saving functions, e.g., UE Power Saving Mode or extended idle mode DRX, then the MME/SGSN may send a NIDD Submit Response (Cause, Requested Re-Transmission Time) message towards the SCEF at 9.4.

If the "skipUeInquiry" indication is set to "false", and the SCEF receives a negative response from MME/SGSN, the SCEF rejects the HTTP DELETE request with a 500 Internal Server Error response with a proper cause value at 9.5, e.g., "UE temporary unreachable" received from MME/SGSN is mapped to a cause value "TEMPORARILY_NOT_REACHABLE". The response may include a Requested Re-Transmission time to indicate the SCS/AS when the UE is expected to be reachable so that the SCS/AS may prepare any re-configuration for the RDS port resource.

At 9.6, if required, the MME/SGSN pages the UE and delivers the non-IP data to the UE using data transfer via the MME/SGSN procedure. If the MME/SGSN is able to initiate the NIDD delivery at 9.6, then the MME/SGSN sends an NIDD Submit Response (cause) message towards the SCEF at 9.7, acknowledging the NIDD Submit Request received from the SCEF at 9.3.

If the SCEF receives a successful delivery response from MME/SGSN, at 9.8, the SCEF shall return 202 Accept to the SCS/AS to indicate the processing is still ongoing, and the procedure proceeds with 9.9; otherwise the SCEF replies with the SCS/AS 500 Internal Server Error and a proper cause value indicating the reason for the delivery failure at 9.8. At 9.9, the UE starts an MO NIDD procedure to include an RDS response for port release.

If the "skipUeInquiry" indication is set to "false" and the SCEF receives a UE response, either success or failure (e.g., failure because the RDS port resource had been released at the UE), the SCEF releases the "individual ManagePort Configuration" resource and notifies the SCS/AS of the currently reserved ports at 9.10 (as described hereinafter with reference to FIG. 10). At 9.11, the SCS/AS acknowledges the notification sent from the SCEF.

FIG. 10 is a sequence diagram showing a UE-initiated procedure for dynamically reserving, releasing, or notifying an RDS port resource according to another embodiment of the present disclosure.

At shown, at 10.1, a UE sends an MO non-IP data to an MME/SGSN, carrying an RDS request which can be a request for reserving, releasing, or notifying an RDS port resource. At 10.2, the MME/SGSN sends an NIDD Submit Request message to an SCEF, carrying the RDS request. At 10.3, the SCEF replies the MME/SGSN with an NIDD Submit Response message (manageEntity in Table 1).

If the RDS request is a request for reserving an RDS port resource (including an NEF port and a UE port), the SCEF reserves the RDS port resource ("individual ManagePort Configuration" resource) when the SCEF port and/or the UE port does not exist in any NIDD configuration in the same APN, and marks the RDS port resource as being created by the UE.

If the RDS request is a request for releasing an RDS port resource, the SCEF releases the RDS port resource ("individual ManagePort Configuration" resource) when the RDS port resource exists in the same NIDD configuration and the RDS port resource is reserved by the UE (referring to manageEntity of the resource).

If the RDS request is a request for notifying an RDS port resource (including an NEF port and a UE port) reserved at the UE, the SCEF reserves the RDS port resource ("individual ManagePort Configuration" resource) when the SCEF port and/or the UE port does not exist in any NIDD configuration in the same APN, and marks the RDS port resource as being created by the UE (manageEntity in Table 1).

Then, at 10.4, the SCEF notifies the SCS/AS with an HTTP POST request including the currently reserved RDS ports, and the SCS/AS acknowledges the POST request at 10.5. At 10.6, if the RDS request is a request for reserving/releasing an RDS port resource, the SCEF sends a response to the UE, according to an MT NIDD procedure.

Figure 11:
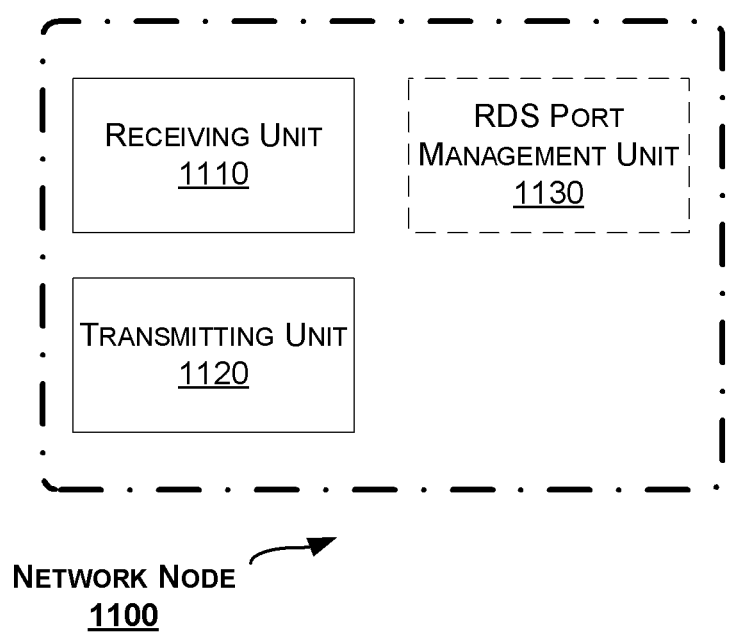
FIG. 11 is a block diagram of a network node for implementing an NEF according to an embodiment of the present disclosure.

Correspondingly to the method 100 or 200 as described above, a network node is provided. FIG. 11 is a block diagram of a network node 1100 for implementing an NEF according to an embodiment of the present disclosure.

The network node 1100 can be operative to, when implementing an NEF, perform the method 100 as shown in FIG. 1. As shown in FIG. 11, the network node 1100 includes a receiving unit 1110 configured to receive, from an AF, a request for dynamically reserving an RDS port resource in association with an NIDD configuration. The request contains an indication indicating whether the reserving of the RDS port resource requires confirmation with the terminal device. The network node 1100 further includes a transmitting unit 1120 configured to transmit, to the AF, a response to the request.

In an embodiment, the request may contain a Uniform Resource Identifier (URI) of the RDS port resource. The URI indicates a first port at the NEF and a second port at a terminal device.

In an embodiment, the network node 1100 may further include an RDS port management unit 1130. When the indication indicates that the reserving of the RDS port resource requires no confirmation with the terminal device, the RDS port management unit 1130 can be configured to reserve the RDS port resource at the NEF when the first port and/or the second port does not exist in any NIDD configuration. In this case, the response may indicate that the RDS port resource has been reserved at the NEF.

In an embodiment, the transmitting unit 1120 may be further configured to notify the terminal device that the RDS port resource has been reserved at the NEF.

In an embodiment, when the indication indicates that the reserving of the RDS port resource requires confirmation with the terminal device, the RDS port management unit 1130 may be further configured to initiate an interaction with the terminal device to reserve the RDS port resource at the terminal device, when the first port and/or the second port does not exist in any NIDD configuration.

In an embodiment, the response may indicate that the confirmation is still ongoing, before a timer associated with the request expires.

In an embodiment, the receiving unit 1110 may be further configured to, receive from the terminal device an RDS response confirming the reserving of the RDS port resource. The RDS port management unit 1130 may be further configured to reserve the RDS port resource at the NEF. The transmitting unit 1120 may be further configured to notify the AF of one or more RDS ports currently reserved at the NEF.

In an embodiment, the RDS port management unit 1130 may be further configured to maintain at the NEF a record that the RDS port resource is reserved by the AF.

In an embodiment, the receiving unit 1110 may be further configured to receive from the terminal device an RDS response indicating failure of the confirmation, and the transmitting unit 1120 may be further configured to notify the AF of one or more RDS ports currently reserved at the NEF.

In an embodiment, when the indication indicates that the reserving of the RDS port resource requires confirmation with the terminal device and when the NEF fails to interact with the terminal device as no Packet Data Network (PDN) connection has been established with the terminal device, the response may indicate that no PDN connection has been established with the terminal device.

In an embodiment, the response may indicate failure in reserving the RDS port resource at the NEF, when the first port and/or the second port already exists in any NIDD configuration.

Alternatively, the network node 1100 can be operative to, when implementing an NEF, perform the method 200 as shown in FIG. 2. As shown in FIG. 11, the network node 1100 includes a receiving unit 1110 configured to receive, from an AF, a request for dynamically releasing an RDS port resource in association with an NIDD configuration. The request contains an indication indicating whether the releasing of the RDS port resource requires confirmation with a terminal device. The network node 1100 further includes a transmitting unit 1120 configured to transmit, to the AF, a response to the request.

In an embodiment, the network node 1100 may further include an RDS port management unit 1130. When the indication indicates that the releasing of the RDS port resource requires no confirmation with the terminal device, the RDS port management unit 1130 can be configured to release the RDS port resource at the NEF when the RDS port resource exists in the NIDD configuration and the RDS port resource is reserved by the AF, and the response may indicate that the RDS port resource has been released at the NEF.

In an embodiment, the transmitting unit 1120 may be further configured to notify the terminal device that the RDS port resource has been released at the NEF.

In an embodiment, when the indication indicates that the releasing of the RDS port resource requires confirmation with the terminal device, the RDS port management unit 1130 may be further configured to initiate an interaction with the terminal device to release the RDS port resource at the terminal device, when the RDS port resource exists in the NIDD configuration and the RDS port resource is reserved by the AF.

In an embodiment, the response may indicate that the confirmation is still ongoing, before a timer associated with the request expires.

In an embodiment, the receiving unit 1110 may be further configured to receive from the terminal device an RDS response confirming the releasing of the RDS port resource or indicating failure in releasing the RDS port resource. The RDS port management unit 1130 may be further configured to release the RDS port resource at the NEF. The transmitting unit 1120 may be further configured to notify the AF of one or more RDS ports currently reserved at the NEF.

In an embodiment, the response may indicate failure in releasing the RDS port resource at the NEF, when the RDS port resource does not exist in the NIDD configuration or the RDS port resource is not reserved by the AF.

In an embodiment, when the indication indicates that the releasing of the RDS port resource requires confirmation with the terminal device and when the NEF fails to interact with the terminal device as no PDN connection has been established with the terminal device, the response may indicate that no PDN connection has been established with the terminal device.

The units 1110 and 1120, and optionally the unit 1130, can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1 or 2.

Figure 12:
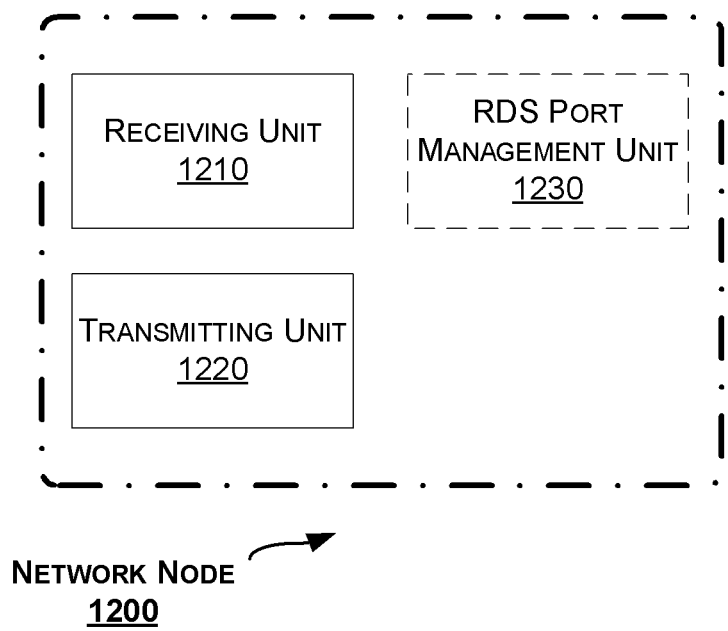
FIG. 12 is a block diagram of a network node for implementing an NEF according to another embodiment of the present disclosure.

Correspondingly to the method 300 as described above, a network node is provided. FIG. 12 is a block diagram of a network node 1200 for implementing an NEF according to an embodiment of the present disclosure.

The network node 1200 can be operative to, when implementing an NEF, perform the method 300 as shown in FIG. 3. As shown in FIG. 12, the network node 1200 includes a receiving unit 1210 configured to receive, in an MO NIDD procedure associated with an NIDD configuration, a RDS request associated with an RDS port resource from a terminal device. The network node 1200 further includes a transmitting unit 1220 configured to notify an AF associated with the NIDD configuration of one or more RDS ports currently reserved at the NEF.

In an embodiment, the RDS request may be for reserving an RDS port resource, and contain a URI of the RDS port resource. The URI indicates a first port at the NEF and a second port at the terminal device. The network node 1200 may further include an RDS port management unit 1230 configured to: reserve the RDS port resource at the NEF when the first port and/or the second port does not exist in any NIDD configuration. The transmitting unit 1220 may be further configured to transmit, in an MT NIDD procedure, to the terminal device an RDS response indicating that the RDS port resource has been reserved at the NEF.

In an embodiment, the RDS port management unit may be further configured to maintain at the NEF an indication that the RDS port resource is reserved by the terminal device.

In an embodiment, the RDS request may be for releasing an RDS port resource. The network node 1200 may further include an RDS port management unit 1230 configured to release the RDS port resource at the NEF when the RDS port resource exists in the NIDD configuration and the RDS port resource is reserved by the terminal device. The transmitting unit 1220 may be further configured to transmit, in an MT NIDD procedure, to the terminal device an RDS response indicating that the RDS port resource has been released at the NEF.

In an embodiment, the RDS request may be for notifying the NEF of an RDS port resource reserved at the terminal device. The RDS port resource has a URI indicating a first port at the NEF and a second port at the terminal device. The network node 1200 may further include an RDS port management unit 1230 configured to reserve the RDS port resource at the NEF when the first port and/or the second port does not exist in any NIDD configuration.

In an embodiment, the RDS port management unit 1230 may be further configured to maintain at the NEF a record that the RDS port resource is reserved by the terminal device.

The units 1210 and 1220, and optionally the unit 1230, can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 13:
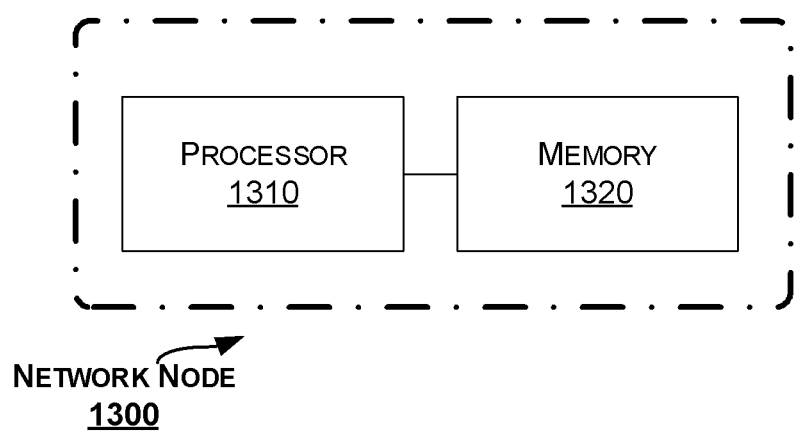
FIG. 13 is a block diagram of a network node for implementing an NEF according to yet another embodiment of the present disclosure.

FIG. 13 is a block diagram of a network node 1300 for implementing an NEF according to another embodiment of the present disclosure.

The network node 1300 includes a processor 1310 and a memory 1320. The memory 1320 may contain instructions executable by the processor 1310 whereby the network node 1300 is operative to, when implementing the NEF, perform the actions, e.g., of the procedure described earlier in conjunction with FIG. 1. Particularly, the memory 1320 contains instructions executable by the processor 1310 whereby the network node 1300 is operative to, when implementing the NEF: receive, from an AF, a request for dynamically reserving an RDS port resource in association with an NIDD configuration. The request contains an indication indicating whether the reserving of the RDS port resource requires confirmation with the terminal device. The memory 1320 further contains instructions executable by the processor 1310 whereby the network node 1300 is operative to, when implementing the NEF: transmit, to the AF, a response to the request.

In an embodiment, the request may contain a URI of the RDS port resource. The URI indicates a first port at the NEF and a second port at a terminal device.

In an embodiment, the memory 1320 may further contain instructions executable by the processor 1310 whereby the network node 1300 is operative to, when implementing the NEF: when the indication indicates that the reserving of the RDS port resource requires no confirmation with the terminal device: reserve the RDS port resource at the NEF when the first port and/or the second port does not exist in any NIDD configuration. The response may indicate that the RDS port resource has been reserved at the NEF.

In an embodiment, the memory 1320 may further contain instructions executable by the processor 1310 whereby the network node 1300 is operative to, when implementing the NEF: subsequent to the operation of reserving, notify the terminal device that the RDS port resource has been reserved at the NEF.

In an embodiment, the memory 1320 may further contain instructions executable by the processor 1310 whereby the network node 1300 is operative to, when implementing the NEF: when the indication indicates that the reserving of the RDS port resource requires confirmation with the terminal device, initiate an interaction with the terminal device to reserve the RDS port resource at the terminal device, when the first port and/or the second port does not exist in any NIDD configuration.

In an embodiment, the response may indicate that the confirmation is still ongoing, before a timer associated with the request expires.

In an embodiment, the memory 1320 may further contain instructions executable by the processor 1310 whereby the network node 1300 is operative to, when implementing the NEF: subsequent to transmitting the response, receive from the terminal device an RDS response confirming the reserving of the RDS port resource; reserve the RDS port resource at the NEF; and notify the AF of one or more RDS ports currently reserved at the NEF.

In an embodiment, the memory 1320 may further contain instructions executable by the processor 1310 whereby the network node 1300 is operative to, when implementing the NEF: subsequent to the operation of reserving, maintain at the NEF a record that the RDS port resource is reserved by the AF.

In an embodiment, the memory 1320 may further contain instructions executable by the processor 1310 whereby the network node 1300 is operative to, when implementing the NEF: subsequent to the operation of initiating, receive from the terminal device an RDS response indicating failure of the confirmation; and notify the AF of one or more RDS ports currently reserved at the NEF.

In an embodiment, when the indication indicates that the reserving of the RDS port resource requires confirmation with the terminal device and when the NEF fails to interact with the terminal device as no PDN connection has been established with the terminal device, the response may indicate that no PDN connection has been established with the terminal device.

In an embodiment, the response may indicate failure in reserving the RDS port resource at the NEF, when the first port and/or the second port already exists in any NIDD configuration.

Alternatively, the network node 1300 includes a processor 1310 and a memory 1320. The memory 1320 may contain instructions executable by the processor 1310 whereby the network node 1300 is operative to, when implementing the NEF, perform the actions, e.g., of the procedure described earlier in conjunction with FIG. 2. Particularly, the memory 1320 contains instructions executable by the processor 1310 whereby the network node 1300 is operative to, when implementing the NEF: receive, from an AF, a request for dynamically releasing an RDS port resource in association with an NIDD configuration. The request contains an indication indicating whether the releasing of the RDS port resource requires confirmation with a terminal device. The memory 1320 contains instructions executable by the processor 1310 whereby the network node 1300 is operative to, when implementing the NEF: transmit, to the AF, a response to the request.

In an embodiment, the memory 1320 may further contain instructions executable by the processor 1310 whereby the network node 1300 is operative to, when implementing the NEF: when the indication indicates that the releasing of the RDS port resource requires no confirmation with the terminal device, release the RDS port resource at the NEF when the RDS port resource exists in the NIDD configuration and the RDS port resource is reserved by the AF. The response may indicate that the RDS port resource has been released at the NEF.

In an embodiment, the memory 1320 may further contain instructions executable by the processor 1310 whereby the network node 1300 is operative to, when implementing the NEF: notify the terminal device that the RDS port resource has been released at the NEF.

In an embodiment, the memory 1320 may further contain instructions executable by the processor 1310 whereby the network node 1300 is operative to, when implementing the NEF: when the indication indicates that the releasing of the RDS port resource requires confirmation with the terminal device, initiate an interaction with the terminal device to release the RDS port resource at the terminal device, when the RDS port resource exists in the NIDD configuration and the RDS port resource is reserved by the AF.

In an embodiment, the response may indicate that the confirmation is still ongoing, before a timer associated with the request expires.

In an embodiment, the memory 1320 may further contain instructions executable by the processor 1310 whereby the network node 1300 is operative to, when implementing the NEF: subsequent to transmitting the response, receive from the terminal device an RDS response confirming the releasing of the RDS port resource or indicating failure in releasing the RDS port resource; release the RDS port resource at the NEF; and notify the AF of one or more RDS ports currently reserved at the NEF.

In an embodiment, the response may indicate failure in releasing the RDS port resource at the NEF, when the RDS port resource does not exist in the NIDD configuration or the RDS port resource is not reserved by the AF.

In an embodiment, when the indication indicates that the releasing of the RDS port resource requires confirmation with the terminal device and when the NEF fails to interact with the terminal device as no PDN connection has been established with the terminal device, the response may indicate that no PDN connection has been established with the terminal device.

Alternatively, the network node 1300 includes a processor 1310 and a memory 1320. The memory 1320 may contain instructions executable by the processor 1310 whereby the network node 1300 is operative to, when implementing the NEF, perform the actions, e.g., of the procedure described earlier in conjunction with FIG. 3. Particularly, the memory 1320 contains instructions executable by the processor 1310 whereby the network node 1300 is operative to, when implementing the NEF: receive, in an MO NIDD procedure associated with an NIDD configuration, a RDS request associated with an RDS port resource from a terminal device; and notify an AF associated with the NIDD configuration of one or more RDS ports currently reserved at the NEF.

In an embodiment, the RDS request may be for reserving an RDS port resource, and contain a URI of the RDS port resource. The URI indicates a first port at the NEF and a second port at the terminal device. The memory 1320 may further contain instructions executable by the processor 1310 whereby the network node 1300 is operative to, when implementing the NEF: reserve the RDS port resource at the NEF when the first port and/or the second port does not exist in any NIDD configuration; and transmit, in an MT NIDD procedure, to the terminal device an RDS response indicating that the RDS port resource has been reserved at the NEF.

In an embodiment, the memory 1320 may further contain instructions executable by the processor 1310 whereby the network node 1300 is operative to, when implementing the NEF: maintain at the NEF an indication that the RDS port resource is reserved by the terminal device.

In an embodiment, the RDS request may be for releasing an RDS port resource, and the memory 1320 may further contain instructions executable by the processor 1310 whereby the network node 1300 is operative to, when implementing the NEF: release the RDS port resource at the NEF when the RDS port resource exists in the NIDD configuration and the RDS port resource is reserved by the terminal device; and transmit, in an MT NIDD procedure, to the terminal device an RDS response indicating that the RDS port resource has been released at the NEF.

In an embodiment, the RDS request may be for notifying the NEF of an RDS port resource reserved at the terminal device. The RDS port resource has a URI indicating a first port at the NEF and a second port at the terminal device. The memory 1320 may further contain instructions executable by the processor 1310 whereby the network node 1300 is operative to, when implementing the NEF: reserve the RDS port resource at the NEF when the first port and/or the second port does not exist in any NIDD configuration.

In an embodiment, the memory 1320 may further contain instructions executable by the processor 1310 whereby the network node 1300 is operative to, when implementing the NEF: maintain at the NEF a record that the RDS port resource is reserved by the terminal device.

Figure 14:
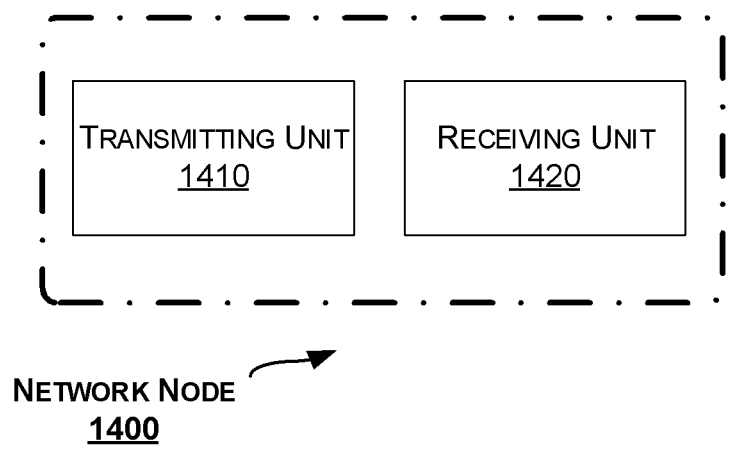
FIG. 14 is a block diagram of a network node for implementing an AF according to an embodiment of the present disclosure.

Correspondingly to the method 400 as described above, a network node is provided. FIG. 14 is a block diagram of a network node 1400 for implementing an AF according to an embodiment of the present disclosure.

The network node 1400 can be operative to, when implementing an AF, perform the method 400 as shown in FIG. 4. As shown in FIG. 14, the network node 1400 includes a transmitting unit 1410 configured to transmit, to an NEF, a request for dynamically reserving or releasing an RDS port resource in association with an NIDD configuration. The request contains an indication indicating whether the reserving or releasing of the RDS port resource requires confirmation with the terminal device. The network node 1400 further includes a receiving unit 1420 configured to receive, from the NEF, a response to the request.

In an embodiment, when the indication indicates that the reserving or releasing of the RDS port resource requires no confirmation with the terminal device, the response may indicate that the RDS port resource has been reserved or released at the NEF, or indicate failure in reserving or releasing the RDS port resource at the NEF.

In an embodiment, when the indication indicates that the reserving or releasing of the RDS port resource requires confirmation with the terminal device, the response may indicate that the confirmation is still ongoing, before a timer associated with the request expires.

In an embodiment, the receiving unit 1420 may be further configured to, subsequent to receiving the response: receive from the NEF a notification of one or more RDS ports currently reserved at the NEF.

In an embodiment, when the indication indicates that the reserving or releasing of the RDS port resource requires confirmation with the terminal device, the response may indicate failure in reserving the RDS port resource at the NEF, or indicate that no PDN connection has been established with the terminal device.

The units 1410 and 1420 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 4.

Figure 15:
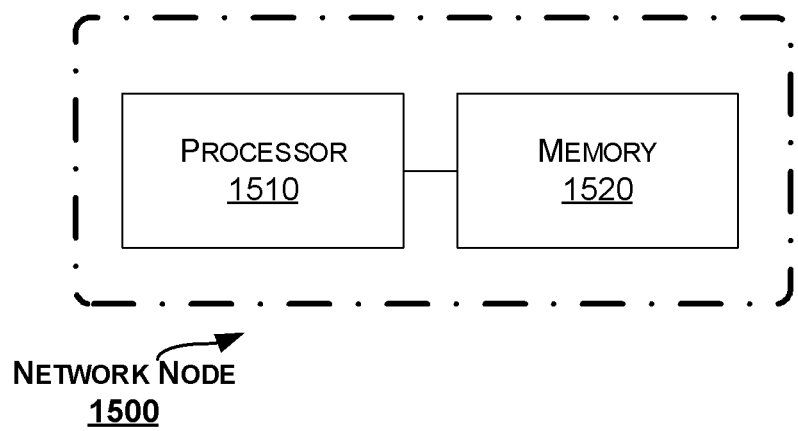
FIG. 15 is a block diagram of a network node for implementing an AF according to another embodiment of the present disclosure.

FIG. 15 is a block diagram of a network node 1500 for implementing an AF according to another embodiment of the present disclosure.

The network node 1500 includes a processor 1510 and a memory 1520. The memory 1520 may contain instructions executable by the processor 1510 whereby the network node 1500 is operative to, when implementing the AF, perform the actions, e.g., of the procedure described earlier in conjunction with FIG. 4. Particularly, the memory 1520 contains instructions executable by the processor 1510 whereby the network node 1500 is operative to, when implementing the AF: transmit, to an NEF, a request for dynamically reserving or releasing an RDS port resource in association with an NIDD configuration. The request contains an indication indicating whether the reserving or releasing of the RDS port resource requires confirmation with the terminal device. The memory 1520 further contains instructions executable by the processor 1510 whereby the network node 1500 is operative to, when implementing the AF: receive, from the NEF, a response to the request.

In an embodiment, when the indication indicates that the reserving or releasing of the RDS port resource requires no confirmation with the terminal device, the response may indicate that the RDS port resource has been reserved or released at the NEF, or indicate failure in reserving or releasing the RDS port resource at the NEF.

In an embodiment, when the indication indicates that the reserving or releasing of the RDS port resource requires confirmation with the terminal device, the response may indicate that the confirmation is still ongoing, before a timer associated with the request expires.

In an embodiment, the memory 1520 may further contain instructions executable by the processor 1510 whereby the network node 1500 is operative to, when implementing the AF: subsequent to receiving the response, receive from the NEF a notification of one or more RDS ports currently reserved at the NEF.

In an embodiment, when the indication indicates that the reserving or releasing of the RDS port resource requires confirmation with the terminal device, the response may indicate failure in reserving the RDS port resource at the NEF, or indicate that no PDN connection has been established with the terminal device.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1310 causes the network node 1300 to perform the actions, e.g., of the procedure described earlier in conjunction with FIG. 1, 2, or 3; or code/computer readable instructions, which when executed by the processor 1510 causes the network node 1500 to perform the actions, e.g., of the procedure described earlier in conjunction with FIG. 4.

The computer program product may be configured as a computer program code structured in computer program modules. The computer program modules could essentially perform the actions of the flow illustrated in FIG. 1, 2, 3, or 4.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Network Exposure Function, NEF, comprising:
   receiving, from an Application Function, AF, a request for dynamically reserving a Reliable Data Service, RDS, port resource in association with a Non-Internet Protocol 'IP' Data Delivery, NIDD, configuration, the request containing an indication indicating whether the reserving of the RDS port resource requires confirmation with the terminal device; and
   transmitting, to the AF, a response to the request.

2. The method of claim 1, wherein the request comprises a Uniform Resource Identifier, URI, of the RDS port resource, the URI indicating a first port at the NEF and a second port at a terminal device.

3. The method of claim 2, further comprising, when the indication indicates that the reserving of the RDS port resource requires no confirmation with the terminal device:
   reserving the RDS port resource at the NEF when the first port and/or the second port does not exist in any NIDD configuration,
   wherein the response indicating that the RDS port resource has been reserved at the NEF.

4. The method of claim 3, further comprising, subsequent to said reserving:
   notifying the terminal device that the RDS port resource has been reserved at the NEF.

5. The method of claim 2, further comprising, when the indication indicates that the reserving of the RDS port resource requires confirmation with the terminal device:
   initiating an interaction with the terminal device to reserve the RDS port resource at the terminal device, when the first port and/or the second port does not exist in any NIDD configuration.

6. The method of claim 5, wherein the response indicates that the confirmation is still ongoing, before a timer associated with the request expires.

7. The method of claim 6, further comprising, subsequent to said transmitting the response:
   receiving from the terminal device an RDS response confirming the reserving of the RDS port resource;
   reserving the RDS port resource at the NEF; and
   notifying the AF of one or more RDS ports currently reserved at the NEF.

8. The method of claim 3, further comprising, subsequent to said reserving:
   maintaining at the NEF a record that the RDS port resource is reserved by the AF.

9. The method of claim 5, further comprising, subsequent to said initiating:
   receiving from the terminal device an RDS response indicating failure of the confirmation; and
   notifying the AF of one or more RDS ports currently reserved at the NEF.

10. The method of claim 1, wherein when the indication indicates that the reserving of the RDS port resource requires confirmation with the terminal device and when the NEF fails to interact with the terminal device as no Packet Data Network, PDN, connection has been established with the terminal device, the response indicates that no PDN connection has been established with the terminal device.

11. The method of claim 1, wherein the response indicates failure in reserving the RDS port resource at the NEF, when the first port and/or the second port already exists in any NIDD configuration.

12. A network node comprising a processor and a memory, the memory comprising instructions enabling the network node to implement a Network Exposure Function, NEF, the network node being configured to, when implementing the NEF, to perform:
- receiving, from an Application Function, AF, a request for dynamically reserving a Reliable Data Service, RDS, port resource in association with a Non-Internet Protocol 'IP' Data Delivery, NIDD, configuration, the request containing an indication indicating whether the reserving of the RDS port resource requires confirmation with the terminal device; and
- transmitting, to the AF, a response to the request.

13. A method in an Application Function, AF, comprising:
- transmitting, to a Network Exposure Function, NEF, a request for dynamically reserving or releasing a Reliable Data Service, RDS, port resource in association with a Non-Internet Protocol 'IP' Data Delivery, NIDD, configuration, the request containing an indication indicating whether the reserving or releasing of the RDS port resource requires confirmation with the terminal device; and
- receiving, from the NEF, a response to the request.

14. The method of claim 13, wherein when the indication indicates that the reserving or releasing of the RDS port resource requires no confirmation with the terminal device, the response indicates that the RDS port resource has been reserved or released at the NEF, or indicates failure in reserving or releasing the RDS port resource at the NEF.

15. The method of claim 13, wherein when the indication indicates that the reserving or releasing of the RDS port resource requires confirmation with the terminal device, the response indicates that the confirmation is still ongoing, before a timer associated with the request expires.

16. The method of claim 15, further comprising, subsequent to said receiving the response:
- receiving from the NEF a notification of one or more RDS ports currently reserved at the NEF.

17. The method of claim 13, wherein when the indication indicates that the reserving or releasing of the RDS port resource requires confirmation with the terminal device, the response indicates failure in reserving the RDS port resource at the NEF, or indicates that no Packet Data Network, PDN, connection has been established with the terminal device.

18. A network node comprising a processor and a memory, the memory comprising instructions enabling the network node to implement an Application Function, AF, the network node being configured to, when implementing the AF, to perform:
- transmitting, to a Network Exposure Function, NEF, a request for dynamically reserving or releasing a Reliable Data Service, RDS, port resource in association with a Non-Internet Protocol 'IP' Data Delivery, NIDD, configuration, the request containing an indication indicating whether the reserving or releasing of the RDS port resource requires confirmation with the terminal device; and
- receiving, from the NEF, a response to the request.

* * * * *

UNITED STATES PATENT AND TRADEMARK OFFICE
CERTIFICATE OF CORRECTION

PATENT NO. : 12,302,421 B2
APPLICATION NO. : 17/927519
DATED : May 13, 2025
INVENTOR(S) : Xu et al.

It is certified that error appears in the above-identified patent and that said Letters Patent is hereby corrected as shown below:

In the Specification

In Column 2, Line 19, delete "Hyper Text" and insert -- Hypertext --, therefor.

In Columns 15 & 16, in TABLE 8, under "Application Error", Line 4, delete "OPERATION_PROHIBITTED" and insert -- OPERATION_PROHIBITED --, therefor.

In Columns 15 & 16, in TABLE 8, under "Description", Line 9, delete "prohibitted." and insert -- prohibited. --, therefor.

In Columns 15 & 16, in TABLE 8, under "Application Error", Line 13, delete "NEXT HOP" and insert -- NEXT_HOP --, therefor.

In Column 21, Line 59, delete "At shown," and insert -- As shown, --, therefor.

In the Claims

In Column 30, Line 21, in Claim 1, delete "the terminal device;" and insert -- a terminal device; --, therefor.

In Column 30, Line 26, in Claim 2, delete "a terminal device." and insert -- the terminal device. --, therefor.

In Column 31, Line 8, in Claim 11, delete "the first port and/or the second port" and insert -- a first port and/or a second port --, therefor.

In Column 31, Line 21, in Claim 12, delete "the terminal device;" and insert -- a terminal device; --, therefor.

Signed and Sealed this
Thirtieth Day of December, 2025

John A. Squires
*Director of the United States Patent and Trademark Office*

CERTIFICATE OF CORRECTION (continued)
U.S. Pat. No. 12,302,421 B2

In Column 31, Lines 30-31, in Claim 13, delete "the terminal device;" and insert -- a terminal device; --, therefor.

In Column 32, Lines 31-32, in Claim 18, delete "the terminal device;" and insert -- a terminal device; --, therefor.